United States Patent
Clark et al.

(10) Patent No.: US 12,053,671 B1
(45) Date of Patent: Aug. 6, 2024

(54) METHOD AND SYSTEM FOR SPORTS SWING TRAINING

(71) Applicant: Diamond Kinetics, Inc., Pittsburgh, PA (US)

(72) Inventors: William W. Clark, Wexford, PA (US); Michael J. Ressler, Wexford, PA (US); Russell W. Clark, Cincinnati, OH (US); Minmin Zhang, Sewickley, PA (US); Esther Lim, Swissvale, PA (US)

(73) Assignee: Diamond Kinetics, Inc., Pittsburgh, PA (US)

( * ) Notice: Subject to any disclaimer, the term of this patent is extended or adjusted under 35 U.S.C. 154(b) by 278 days.

(21) Appl. No.: 17/514,688

(22) Filed: Oct. 29, 2021

Related U.S. Application Data

(60) Provisional application No. 63/108,128, filed on Oct. 30, 2020.

(51) Int. Cl.
  *A63B 24/00* (2006.01)
  *A63B 60/46* (2015.01)
  *A63B 69/00* (2006.01)

(52) U.S. Cl.
  CPC .......... *A63B 24/0006* (2013.01); *A63B 60/46* (2015.10); *A63B 69/0002* (2013.01); *A63B 2024/0009* (2013.01); *A63B 2069/0008* (2013.01); *A63B 2220/806* (2013.01)

(58) Field of Classification Search
  CPC . A63B 24/0006; A63B 60/46; A63B 69/0002; A63B 69/0008; A63B 2220/806
  See application file for complete search history.

(56) References Cited

U.S. PATENT DOCUMENTS

| | | | |
|---|---|---|---|
| 9,694,267 B1 | 7/2017 | Thornbrue et al. | |
| 9,851,374 B2 | 12/2017 | Clark et al. | |
| 9,895,590 B2 | 2/2018 | Jeffrey et al. | |
| 10,124,230 B2 | 11/2018 | Thornblue et al. | |
| 10,213,645 B1* | 2/2019 | Wu | A63B 24/0003 |
| 10,286,282 B2 | 5/2019 | Ito et al. | |
| 10,456,653 B2 | 10/2019 | Thornblue et al. | |
| 10,558,854 B2* | 2/2020 | Watanabe | G09B 19/0038 |
| 10,565,895 B2* | 2/2020 | Sato | G09B 19/0038 |

(Continued)

OTHER PUBLICATIONS

"Baseball bat sensor—Swing Tracker sensor and app product review." https://www.youtube.com/watch?v=mdS2BluKVel. Dec. 2, 2015 (Year: 2015).*

(Continued)

*Primary Examiner* — Reginald A Renwick
(74) *Attorney, Agent, or Firm* — Fox Rothschild LLP

(57) ABSTRACT

A method of analyzing swing of a player of a sport is disclosed. A system uses sensors to capture data representing a path of motion of a sporting good (such as a bat) object as a person swings the object toward a target (such as a ball), over multiple swings of the object. For each of the captured paths of motion, the system determines a slot representing a portion of the swing along which the object traveled in approximately a straight line leading to a point of impact with the target. The system saves the slots to a swing fingerprint data set in a data store. The system generates a visual representation of the swing fingerprint data set by outputting the slots on a display as viewed one or more viewing angles and/or dimensions.

29 Claims, 14 Drawing Sheets

(56) References Cited

U.S. PATENT DOCUMENTS

| | | | |
|---|---|---|---|
| 10,888,735 B2 | 1/2021 | Clark et al. | |
| 2019/0009133 A1* | 1/2019 | Mettler May | G09B 19/0038 |
| 2019/0209909 A1* | 7/2019 | Thornbrue | A63B 69/3635 |
| 2019/0224528 A1* | 7/2019 | Omid-Zohoor | A61B 5/6806 |

OTHER PUBLICATIONS

Sonnenfeld, J. et al., An Analysis of In Vivo Hip Kinematics in Elite Baseball Batters Using a Markerless Motion-Capture System, Anthroscopy, Sports Medicine, and Rehabilitation, 2021, e1-e9.

Nakano, N. et al., Evaluation of 3D Markerless Motion Capture Accuracy Using OpenPose With Multiple Video Cameras, Frontiers in Sports and Active Living, May 2020, vol. 2, Art. No. 50.

McGinnis, R. et al., A new technology for resolving the dynamics of a swinging bat, ResearchGate, Sports Engineering, Mar. 2012.

Li, Z. et al., Visibility Analysis on Swing Motion of the Golf Player Based on Kinect, Springer International Publishing AG 2017, V.G. Duffy (Ed.): DHM 2017, Part 1, LNCS 10286, pp. 115-126.

\* cited by examiner

| Condition | Metrics | Mean | Standard Deviation | Sentence |
|---|---|---|---|---|
| Summary | Heading | Oppo | Consistent | Your swings set up to push the ball to the opposite field. |
| Summary | Heading | Oppo | Inconsistent | Your swings tend to align to hit the ball to the opposite field, but not consistently. |
| Summary | Elevation | Positive | Consistent | You can drive the ball in the air regardless of pitch location. |
| Summary | Elevation | Positive | Inconsistent | Your swings set up to drive the ball in the air, but not consistently. |
| Summary | Elevation | Flat | Consistent | You can hit hard line drives regardless of pitch location. |
| Summary | Elevation | Flat | Inconsistent | Your swings set up to hit line drives, but not consistently. |
| Summary | Elevation | Negative | Consistent | Your hardest hit balls will be grounders. |
| Summary | Elevation | Negative | Inconsistent | Your swings set up to swing to hit hard grounders, but not consistently. |
| Summary | Speed | Fast | Consistent | You have high bat speed for your competition level which can produce high ball exit speed regardless of pitch location. |
| Summary | Speed | Fast | Inconsistent | You can swing with high bat speed for your competition level, but not consistently. |
| Summary | Speed | Average | Consistent | You have average bat speed for your competition level which can produce average exit speed for all pitch locations. |
| Summary | Speed | Average | Inconsistent | You tend to have average bat speed for your competition level, but your speed is inconsistent. |
| Summary | Speed | Slow | Consistent | You have lower than average bat speed for your competition level which will produce low ball exit speed. |
| Summary | Speed | Slow | Inconsistent | You tend to have lower than average bat speed for your competition level, and your speed is inconsistent. |
| Good | Heading | up_the_middle | Consistent | You are good at hitting the ball up the middle consistently when the pitch is in this part of the zone. |
| Good | Heading | up_the_middle | Inconsistent | |
| Good | Heading | Pull | Consistent | You are good at pulling the ball consistently when the pitch is in this part of the zone. |
| Good | Heading | Pull | Inconsistent | |
| Good | Heading | Oppo | Consistent | You are good at hitting the ball oppo consistently when the pitch is in this part of the zone. |
| Good | Heading | Oppo | Inconsistent | |

FIG. 12

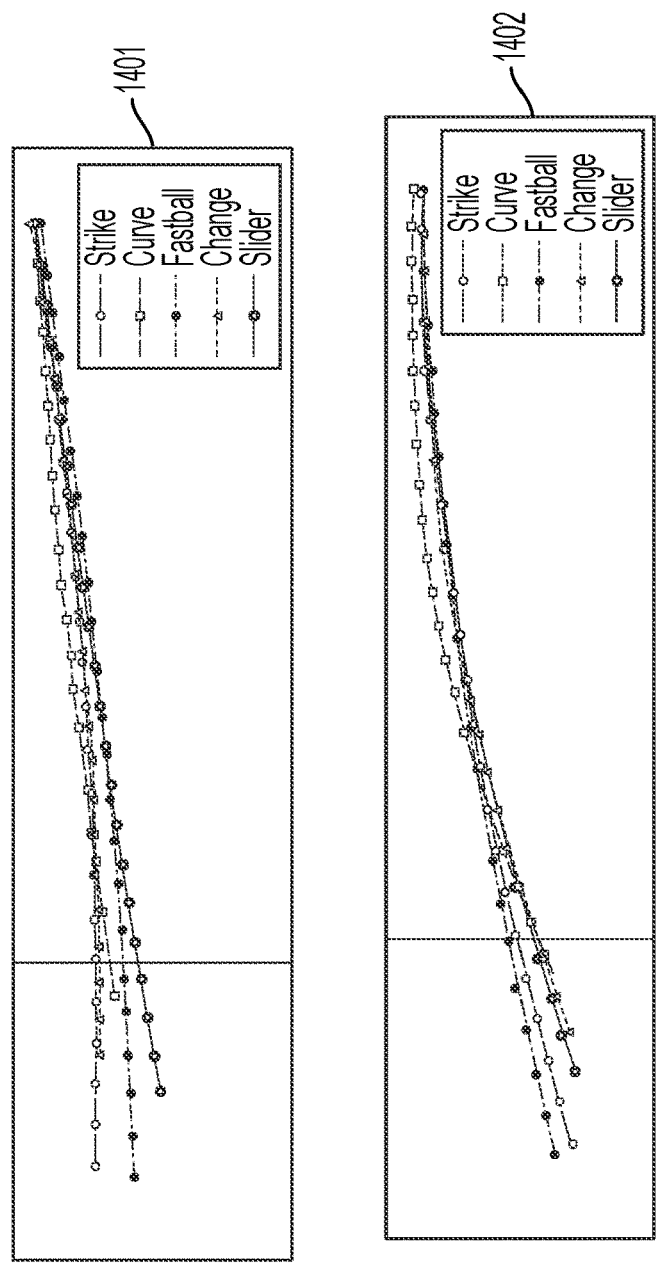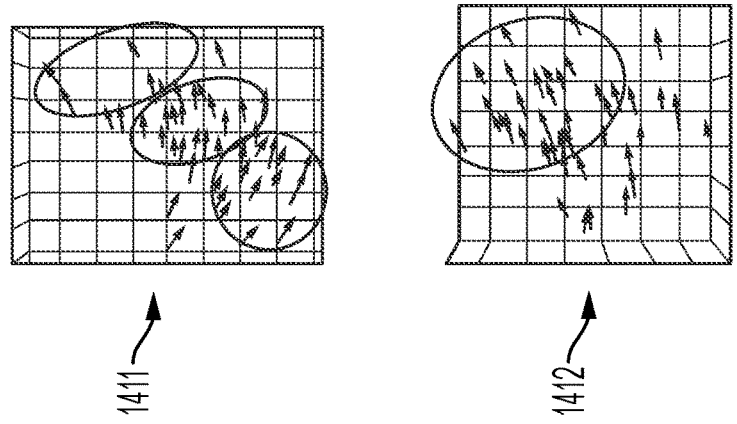
FIG. 14

METHOD AND SYSTEM FOR SPORTS SWING TRAINING

RELATED APPLICATIONS AND CLAIM OF PRIORITY

This patent document claims priority to U.S. provisional patent application No. 63/108,128, filed Oct. 30, 2020. The disclosure of the priority application is fully incorporated into this document by reference.

BACKGROUND

At all levels of individual and team sports, participants seek ways to improve player performance. For example, in baseball or softball, improvements in a player's hitting technique can raise the player's batting average and help the player's team win more games.

To continually increase performance, coaches and players rely not only on personal instincts and visual observations. Increasingly, coaches and players in baseball, softball and other sports in which a player swings a bat or other object to hit a ball or other target seek new technologies and equipment to help players gain an extra edge by correcting errors and learning proper swing techniques. Initially, participants used video cameras to record a player's swing so that the player and coach could observe the player's technique and correct errors. More recently, on-bat or in-bat sensors have been developed that can track and record motion data and generate feedback based on the data. However, improvements in data capture systems, data analysis techniques, and feedback generation and delivery methods are continually sought after as participants seek additional technologies that can help improve their performance.

This document describes methods and systems that are designed to address the issues mentioned above.

SUMMARY

This document describes methods and systems for analyzing a person's swing of an object toward a target, such as a swing of a bat toward a ball. In various embodiments, one or more sensors will capture motion data for an object as a person swings the object toward the target. A processor will derive, from the motion data, a plurality of paths of motion of the object over a plurality of swings. For each of a plurality of the captured paths of motion, the processor will determine a slot representing a portion of the path of motion along which the object traveled immediately prior to reaching a point of impact with the target. The processor will save a plurality of the slots to a swing fingerprint representation data set in a data store.

In some embodiments, the one or more sensors comprise an inertial measurement unit (IMU) that is attached to the object. In such embodiments, capturing the data may include capturing measurements of linear accelerations of the object and/or rotational velocities of the object prior to the point of impact.

In some embodiments, determining each of the slots comprises, for each slot: (a) determining a heading angle for the object in the slot; and (b) determining an elevation angle for the object in the slot.

In some embodiments, the system will output a visual representation of the swing fingerprint data set from a plurality of viewing angles on a display device. The visual representation of the swing fingerprint data set will comprises one or more of the following: (a) a top-down view that illustrates each of the slots in the swing fingerprint data set with a heading angle of the object in each slot; or (b) a side view that illustrates each of the slots in the swing fingerprint data set with an elevation angle of the object in each slot. Optionally, outputting the visual representation of the swing fingerprint data set further includes displaying a plurality of regions in the visual representation. If so, then when illustrating each slot, the system may present the slot in a region having a color that represents a measured parameter or a function of the measured parameter of the object for that slot. In addition or alternatively, the system may display each region in a color that represents a function of a measured parameter of the object over multiple swings for which slots are associated with that region. The measured parameter or function of the measured parameter of the object may include one or more of the following: speed of the object at the point of impact; acceleration of the object toward the point of impact; trigger to impact time for the object; or length of the slot in a specified direction.

As another option, the system may output a three-dimensional visual representation of the swing fingerprint data set on a display device, wherein the three-dimensional visual representation comprises a zone with a plurality of subregions. If so, then before including any of the subregions in the visual representation, the system may assign a color to the subregion, wherein the assigned color for each subregion is derived from a speed of the object over one or more swings for that subregion.

In some embodiments when the system displays a three-dimensional visual representation, the system may receive, via a user interface, a selection of a layer in the three-dimensional visual representation. The layer may comprise a contiguous group of the subregions. Upon receipt of the selection of a layer, the system will display, on the display device, a two-dimensional representation of the contiguous group of subregions in the selected layer.

Optionally, the system may output a user interface via which a user may select and the system may receive a selection of a view to be displayed. The user interface may allow the user to choose the selected view from a plurality of candidate views that include: (a) a top-down view that illustrates each of the slots in the swing fingerprint with a heading angle of the object for each slot; (b) a side view that illustrates each of the slots in the swing fingerprint with an elevation angle of the object for each slot; and (c) a three-dimensional visual representation that illustrates a plurality of color-coded subregions, in which each the color of each subregion is derived from a speed of the object for one or more slots in that subregion. The system will then output the selected view on a display device.

In various embodiments, the one or more sensors may include a motion sensor configured to attach to the object and capture motion data as the person swings the object toward the target. For example, the motion sensor may include an inertial measurement unit. In such configurations, the motion data may include measurements of linear accelerations of the object prior to the point of impact, and rotational velocities of the object prior to the point of impact.

Any of the steps above may be embodied programming instructions that are stored in a computer-readable medium.

BRIEF DESCRIPTION OF THE DRAWINGS

FIG. 12 shows an example table of candidate feedback statements that the system may present to a user based on analysis of a player's swing fingerprint data.

FIG. 14 illustrates a comparison of swing fingerprint data for a hitter to pitching characteristics of a pitcher.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" (or "comprises") means "including (or includes), but not limited to." When used in this document, the term "exemplary" is intended to mean "by way of example" and is not intended to indicate that a particular exemplary item is preferred or required.

In this document, when terms such "first" and "second" are used to modify a noun, such use is simply intended to distinguish one item from another, and is not intended to require a sequential order unless specifically stated. The term "approximately," when used in connection with a numeric value, is intended to include values that are close to, but not exactly, the number. For example, in some embodiments, the term "approximately" encompasses a range of values that are within +/−10 percent of the specified numeric value.

When used in this document, terms such as "top" and "bottom," "upper" and "lower", or "front" and "rear," are not intended to have absolute orientations but are instead intended to describe relative positions of various components with respect to each other. For example, a first component may be an "upper" component and a second component may be a "lower" component when a device of which the components are a part is oriented in a first direction. The relative orientations of the components may be reversed, or the components may be on the same plane, if the orientation of the structure that contains the components is changed. The claims are intended to include all orientations of a device containing such components.

Additional terms that are relevant to this disclosure are defined at the end of this Detailed Description section.

Figure 1:
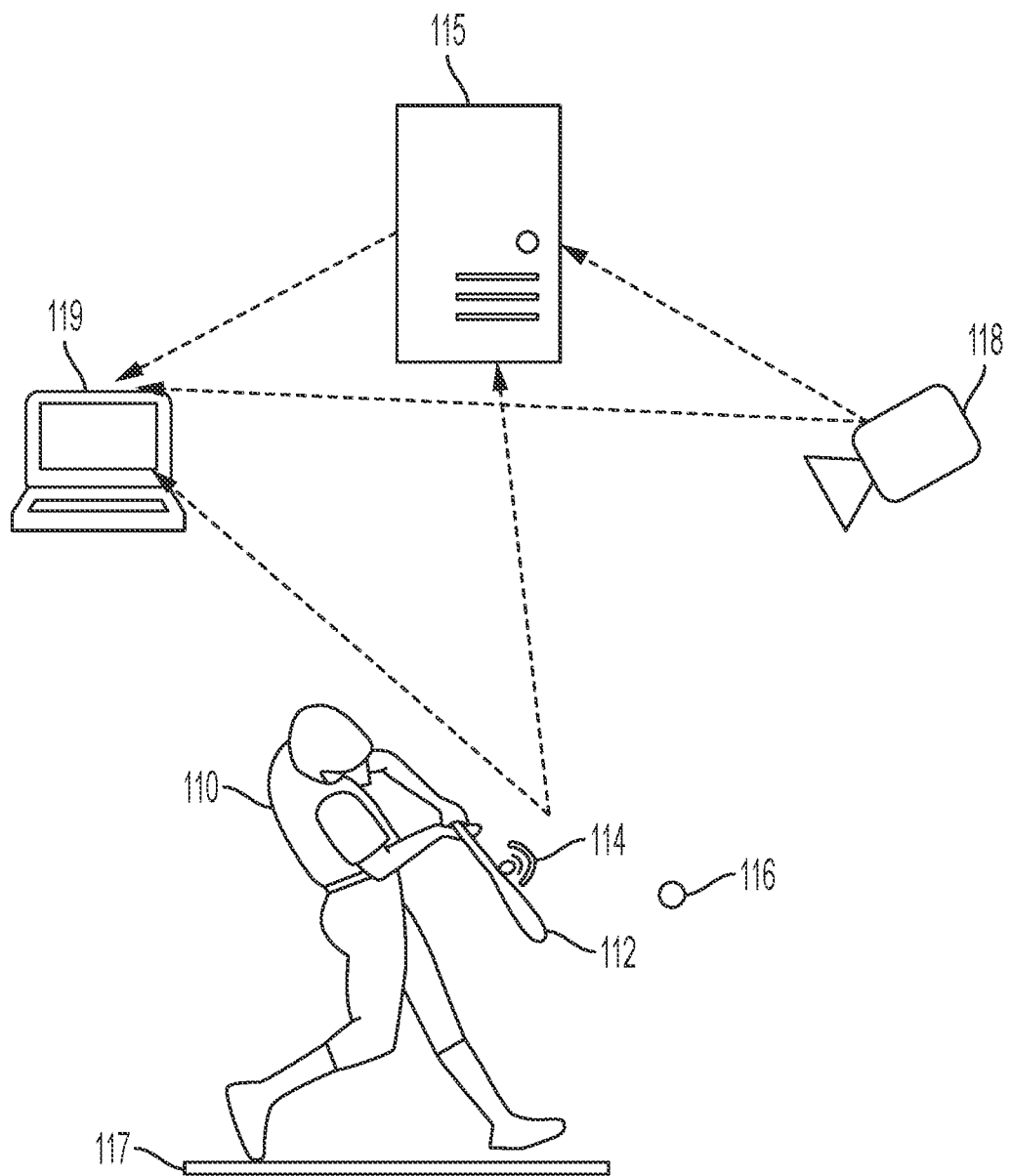
FIG. 1 illustrates an example system for sports swing analysis and feedback generation.

FIG. 1 illustrates an example system for sports swing analysis and feedback generation. The player 110 is depicted as a baseball or softball player swinging a bat 112. However, the system may be used in any activity in which a person swings an object to hit a ball or other target, such as a softball player swinging a bat, a tennis player swinging a racket, a golfer swinging a club, a carpenter swinging a hammer, or other individuals moving other tools or sporting goods toward an object or target. This description will use the term "player" or "batter" to refer to any person that swings an object to hit a target, and this description will use the term "bat" to refer to the object that the person is swinging, and this description may use the terms "ball" and "target" interchangeably to refer to the object that the player is trying to hit with the bat. However, it is to be understood that this disclosure is not limited to bats and baseball or softball players.

In the system of FIG. 1, the bat 112 includes an embedded or attached motion-tracking sensor 114 that includes hardware for tracking the path of motion of the bat during the player's swing. The motion-tracking sensor 114 may include any individual or combination of single or multiple-axis accelerometers, gyroscopes, magnetometers, radio-frequency sensors, and/or inertial measurement units (IMU), by way of example. (This document may use the term interial measurement unit to broadly refer to the category of sensors that include a complete IMU, as well sensors that are commonly components of an IMU, such as 3-axis accelerometer, a 3-axis gyroscope and a 3-axis magnetometer.) Optionally, the motion-tracking sensor 114 may have an onboard processing device and memory so that the sensor also serves as a computing device and/or data storage device. The sensor 114 also may include or be connected to a transmitter for sending and/or receiving instructions and information about its operation and/or for transmitting data collected and/or analysis results to a server 115 and/or computing device 119 such as a laptop computer, desktop computer, microcontroller-based unit, tablet computer, or mobile phone via one or more wired or wireless communication networks, or by direct transmission using near-field or short-range communication technology. Alternatively, the sensor may simply gather data and transmit the data to the server 115 and/or computing device 119. Examples of suitable motion tracking sensors are disclosed in U.S. Pat. No. 9,851,374 to Clark et al., the disclosure of which is fully incorporated into this document by reference.

Optionally, in addition or as an alternative to the motion tracking sensor 114, the system may include one or more cameras 118 that are positioned to capture digital video (a sequence of digital images) of the player 110 as the player 110 is swinging the bat 114. The camera 118 also may include or be communicatively connected to a transmitter via which the camera can transmit its captured data to the server 115 and/or computing device 119.

Optionally, in addition to or as an alternative to the motion tracking sensor 114 and/or cameras 118, the system may include one or more other sensors 117 via which one may derive data about the player motion and the swing from other sensors, such as force plates under the player's feet (as shown in FIG. 1), force sensors in the bat handle, strain gauges on the bat, near-field proximity sensors, ultra-wideband position and motion sensors, radar sensors, and other wearable sensors.

The system also may include a target 116 (such as a ball) toward which the player will swing the bat and try to contact the target. The target 116 may be moving or stationary. The target 116 may be a real, physical target in some embodiments. Alternatively, if the player 110 is wearing a virtual reality (VR) or augmented reality (AR) media player that places a display in front of the player's eyes, the target 116 may be a virtual target that is output on the display of the media player.

The system such as that described in FIG. 1 above may be used to create a characterization or model of the player's swing characteristics, referred to in this document as a "swing fingerprint" representation. The system may then use the player's swing fingerprint representation and/or data gathered to develop the swing fingerprint representation to guide the player to understand, gain insights about, and improve his or her swing, and/or to learn better game strategy related to his or her swing. The system also may present the player's swing fingerprint representation and associated information to another person, such as a coach or a scout, who can use it to help assess and/or train the player. Additional information about system output will be described below. The on-bat or in-bat motion tracking sensor 114, the cameras 118, or both will capture the bat's motion data through the player's swing and use that data to develop the swing fingerprint representation as described below.

In addition to capturing information about the bat, one or more motion tracking sensors may be attached to one or more locations on the player's body during the swing. Similarly, the camera may be used to capture movement of the player's body during the swing. The body movement information, for example movement of individual body segments or coordination of body segments during the swing, may also be considered as part of or along with the player's "swing fingerprint" representation.

In systems in which video is used to capture the motion, calculations of the player's body motions such as position and orientation of body segments or joints and/or derivatives of those quantities with respect to time, may be captured in conjunction with or synchronized in time with the bat motion. In addition, for the case of a moving target such as a ball, the ball motion in three-dimensional space may be captured by video or other means in conjunction with or synchronized in time with the bat motion. The player's body movements may be used to create the swing fingerprint representation, to supplement the player's swing fingerprint representation, or (in conjunction with the swing fingerprint) to provide other data.

In addition to capturing information about the bat and the player's body, one or more motion tracking sensors may be attached to or embedded within the ball or other target 116 to capture the target's position and/or trajectory during any portion of a time period before, during, or after the swing. Similarly, the cameras 118 may be used to capture movement of the target 116. The target's position and/or movement may be used to create the player's swing fingerprint representation, to supplement the player's swing fingerprint representation, or (in conjunction with the swing fingerprint representation) to provide other data.

One characteristic of the player's swing that the system may capture is the "barrel slot" of the player's swing. Barrel slot is a straight-line fit of a portion of the bat's barrel path during the swing leading up to the point of the object's impact with the target. In this document, the term "barrel" is used generally to describe a point of interest on the bat or other swinging object, and it may describe the knob at a first end of the bat, the tip at the opposite end of the bat, or any other point in between the two endpoints, and the term "slot" will be used to represent the straight-line fit of a portion of the bat's barrel path during the swing immediately prior to (and optionally including and/or immediately after) the point of the object's impact with the target. By capturing the portion of the barrel path that is approximately a straight line, within a given tolerance (for example, approximately ½ of the diameter of a baseball or other target, or approximate 2 inches), one can visualize the direction of barrel movement, the speed of the barrel, and the distance over which it travels on that approximate straight path for a given swing.

Figure 2:
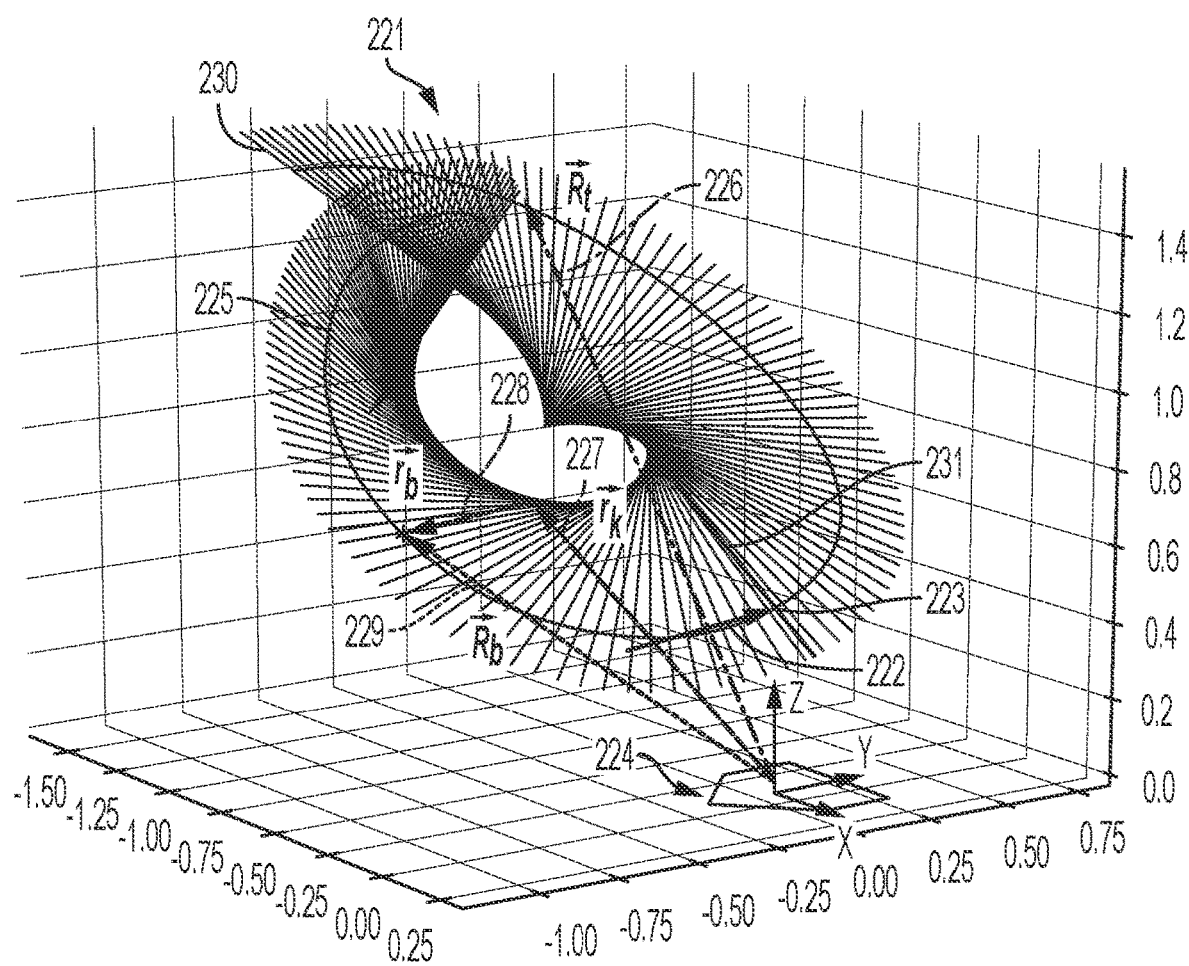
FIG. 2 illustrates an example visual representation of a player's swing that the system of FIG. 1 may capture, with vectors shown that locate key points of interest in the three-dimensional field frame.

FIG. 2 illustrates an example visualization of a player's swing trajectory 221, where representations of the bat with respect to time during the swing are illustrated by the elliptical pattern of lines, the last of which is identified as line 230. Line 231 depicts a bat location and orientation at a particular time point of interest, for example at initial impact between the ball and bat. The barrel slot is illustrated by arrow 222 that appears on the portion of the swing path leading up to the point of impact 223 when the bat first contacts the target ball. The swing trajectory 221 may be plotted in relation to a coordinate system located in the frame of the field or court or facility in which the game is played. For example, the field frame coordinate system has an origin that may be arbitrarily placed at a fixed location, such as the center of home plate, and may be defined to have an orientation as shown in FIG. 2 with the Y-axis pointing in the direction from the catcher toward the pitcher on a baseball field (or the player toward the direction of the other player in a tennis court, or the player toward the hold on a golf course), the X-axis pointing perpendicular to Y from one batter's box to the other, and the Z-axis pointing upwards in opposition to gravity. Barrel slot may be characterized by at least some or all of the following three parameters: elevation angle (the angle of the barrel path in the vertical plane, that is the Y-Z plane in FIG. 2); heading angle (the angle of the barrel path in the horizontal plane, that is the X-Y plane in FIG. 2); and length (as defined above, that is, the length of the approximate line of a point of interest on the bat). In addition, there is a characteristic speed of the barrel during the time it is on the approximate straight path, which can be characterized by the speed at impact with the target ball, the average speed over the barrel slot, or any other characteristic speed during that time.

In order to graphically depict information about the bat swing motion, one may calculate that information from the sensor data. In particular, one may wish to know the locations, orientations, and velocities of the bat itself as it moves in three-dimensional space (as depicted in FIG. 2), or one may wish to know any particular metric such as the barrel slot 222 in FIG. 2, or some other motion, position, orientation, or timing information of the swing. The system may obtain bat trajectory and associated velocities by analysis of the sensor data using now or hereafter known computational algorithms, examples of which will be described below. The system may determine the sensor's motion (position and orientation and associated derivatives) in three-dimensional space from, for example, measured acceleration, angular velocity, and/or magnetic field versus time using the motion tracking sensor 114. Since the motion tracking sensor 114 includes an IMU and is fixed to the bat 111, and both bat 111 and sensor 114 move as a rigid body throughout the swing, sensor motion in space can be projected to motion of any point on the bat 111 or other rigid body to which the sensor 114 is attached by now or hereafter known kinematics analyses. In addition, the system can use inverse dynamics analysis to calculate from measured information and known or approximate bat mass properties the forces and torques that were imparted to the bat 111 versus time to create the motions. The trajectory 221 in FIG. 2 illustrates the bat's position at sequential time points during the swing, with any particular point on the bat shown as a three-dimensional line that traces its path in space.

Example processes by which the system may use motion tracking sensor data to determine bat trajectory are described in U.S. Pat. No. 10,888,735 to Clark et al., titled "Calibration of initial orientation and position of sports equipment and body segments for inertial sensors", the disclosure of which is fully incorporated into this document by reference. In the methods described in that patent, when the bat is in a stationary position prior to being swung, the initial position of the bat's motion sensor in the three axes of the global frame is known. The system then calculates the sensor's position and orientation, as well as rotational velocity values from the end of the stationary period (i.e., the start of the swing) to the end of the normal motion (end of swing). The system then may use this data to determine a swing trajectory using a dynamic reconstruction algorithm as described in that patent.

Methods by which a system may determine bat trajectory and other parameters of a swing from a sequence of video frames that capture the swing are disclosed in King et. al, "A New Technology for Resolving the Dynamics of a Swinging Bat," published 2012 in Sports Eng. (2012) 15:41-52. In this example, the bat is outfitted with reflective markers, and multiple cameras are used to capture video sequences of a swing. The marker positions in each frame, with a known frame rate, are recorded and provide the basis for reporting the bat's trajectory and speed for each swing. Markers also may be placed on the batter (i.e., the person who is swinging the bat) to capture motion of the person.) Other motion capture techniques may be uses, including but not limited to markerless motion capture techniques such as those described in Nakano et al., "Evaluation of 3D Markerless Motion Capture Accuracy Using OpenPose with Multiple Video Cameras," Front. Sport Act. Living (May 27, 2020). In this example, instead of placing markers on the bat or the batter, a neural network is trained on manually labeled image data, in which the labels mark keypoints on the bat and batter. Then, after the neural network is trained, new video sequences of swings may be fed into the neural network, which will analyze the frames of the sequence and output the locations of the keypoints in each frame. The system may then use this output, along with the known frame rate, to derive the bat trajectory and speed.

FIG. 2 also illustrates a field frame that is defined by coordinate axes X-Y-Z 224 located at the origin of the coordinate system. The system may use these axes to define any point in the swing trajectory 221 by a vector from the field frame origin. For example, vector $\vec{R}_t$ 226 shows the position of the tip of the bat in the field frame at the beginning of the swing. Vector combination $\vec{r}_k$ 227 and $\vec{r}_b$ 228, which form vector $\vec{R}_b$ 229 as $\vec{R}_b = \vec{r}_k + \vec{r}_b$, shows the location of some point of interest on the bat in the field frame at an arbitrary time during the swing. Vector $\vec{r}_k$ describes the location of the knob of the bat at that instant in time, and vector $\vec{r}_b$ is directed along the length of the bat to some desired point. Addition of those two vectors enables the determination of the point of interest in the field frame.

The system may determine the bat trajectory depicted in FIG. 2 by analyzing video data captured by the one or more cameras, using known methods in the literature such as the King and Nakano references described above, or the system may use a combination of motion tracking sensor data and camera images to determine the path and motion of the bat. Similar techniques may be used to obtain motion and orientation information about position, movement, and coordination of player body segments and joints or ball position and movement from motion tracking sensors, camera data, or both. For example, just as the system may derive the bat's trajectory and speed from data output by a motion tracking tracking sensor attached to the bat, the system may derive the trajectory and speed of the batter's hands and/or arms from the same data. In addition, just as the system can use markers or markerless motion capture technology to identify key points on the bat, it can also use the same technology to identify key points in the batter, such as the locations of the batter's head, hips, shoulders, elbows, knees or other parts of the batter's body.

A particular point of interest in space related to the bat movement is the location of the ball-bat contact point in three-dimensional space, which may be determined in any of several different ways. For example, a user may place the hitting tee or offer pitches at known locations that are recorded in an application on the computing device such that swing data is collected to coincide with those locations; or the computing device may instruct the user where to place the tee or where to locate the pitches such that the swing data coincides with those locations.

The system may calculate or estimate the ball-bat contact point along the bat trajectory 221 using the sensor data by calculating the position and orientation of the bat in three-dimensional space at the time instant of contact, and then from that information the location of one or more points of interest on the bat at the instant of ball-bat contact may be found. For example, the system may infer the time instant of contact during the swing from the dynamic signature of the measured data, where a representative change in acceleration and/or angular velocity of the motion tracking sensor along one or more axes connected to the bat generally occurs. For example, when the rotational speed of the sensor increases or decreases (depending on the rotational axis being assessed) by at least 50%, 75%, 100%, or another threshold value, the system may infer that impact occurs. If video data is available, the system may infer the time of impact by analyzing a sequence of video frames and using image processing techniques to find a frame or a subsequence of frames within the larger sequence when the ball and bat collide, or to find a frame or a sub-sequence of frames in which a change in direction of the ball first occurs (such as moving away from the batter rather than toward the batter).

Knowing the time instant of impact, the system may analyze the bat position and orientation at that instant to calculate ball location in 3-dimensional space. For example, FIG. 2 shows vector $\vec{r}_k$ 227, which defines the calculated location of the knob of the bat at some point in time during the swing, which could be the time of impact with the ball. The vector $\vec{r}_k$ may be defined as $\vec{r}_k = a\hat{i} + b\hat{j} + c\hat{k}$ where $\hat{i}$, $\hat{j}$, and $\hat{k}$ are unit vectors in the X, Y, and Z directions, respectively, and a, b, and c are scalar distances that define the location of the end of that vector relative to its origin, along the three coordinate axes. In this manner, vector $\vec{r}_k$ defines the location of the knob of the bat in 3-dimensional space at the desired instant during the swing. Vector $\vec{r}_b$ likewise represents the location of some point on the bat in three-dimensional space, and it may be defined as $\vec{r}_b = d\hat{i} + e\hat{j} + f\hat{k}$, where d, e, and f are scalar distances that likewise define the location of the end of that vector relative to its origin, along the three coordinate axes. The vector $\vec{r}_b$ in the field frame (X-Y-Z) may be determined by first defining it in the bat frame ($x_b$-$y_b$-$z_b$ where one axis is along the centerline of the bat and the other axes are perpendicular to the centerline) and then rotating that vector to the field frame using a coordinate rotation matrix defined by calculation from the sensor data. Since the origin of vector $\vec{r}_b$ is placed at the end of $\vec{r}_k$ (the knob of the bat in this example), then vector $\vec{r}_b$ points along the length of the bat. Therefore, the vector sum $\vec{r}_k + \vec{r}_b$, which is represented in FIG. 2 as vector $\vec{R}_b$ 229, defines the location of some point along the length of the bat in three-dimensional space, or $$\vec{r}_b + \vec{r}_b = (a\hat{i} + b\hat{j} + c\hat{k}) + (d\hat{i} + e\hat{j} + f\hat{k}) = (a+d)\hat{i} + (b+e)\hat{j} + (c+f)\hat{k}$$

Knowing or assuming the location of the batter, using measured information or inferring from features in the swing, for example the load position as described in Clark et. al., "Calibration of Initial Orientation and Position of Sports Equipment and Body Segments for Inertial Sensors," the system can relate the bat trajectory information and any other locational information about the swing with respect to the player or home plate.

For some swings, the system may determine the actual ball-bat impact point along the length of the bat and/or around the circumference by analyzing information from the motion tracking sensors such as the vibrations of the bat after impact and inferring impact point on the bat based on specific vibration characteristics. In other cases the ball-bat impact location on the bat may be determined by other means of measurement, such as video camera images. If the ball-bat impact location on the bat is known, then the vector $\vec{r}_b$ 229 may point to that location relative to the knob of the bat, and the length of the vector defined by $|\vec{r}_b| = \sqrt{d^2 + e^2 + f^2}$ is the distance from the knob to that impact location. In some swings the location of ball-bat impact on the bat may not be known precisely and may be approximated as being a predetermined position along the length of the bat and at a predetermined position around the bat's circumference. For example, the ball-bat impact point on the bat may be assumed to be at the center of the bat's width (that is, a direct impact and not a glancing blow off the top or bottom of the bat) and at a fixed distance from the knob of the bat (such as 75% of the length or 80% of the length or 85% of the length). In this case, the length of the vector defined by $|\vec{r}_b| = \sqrt{d^2 + e^2 + f^2}$ would be aL where L is the bat's total length and a is the assumed distance to contact such as 0.75, 0.8, or 0.85.

Figure 3:
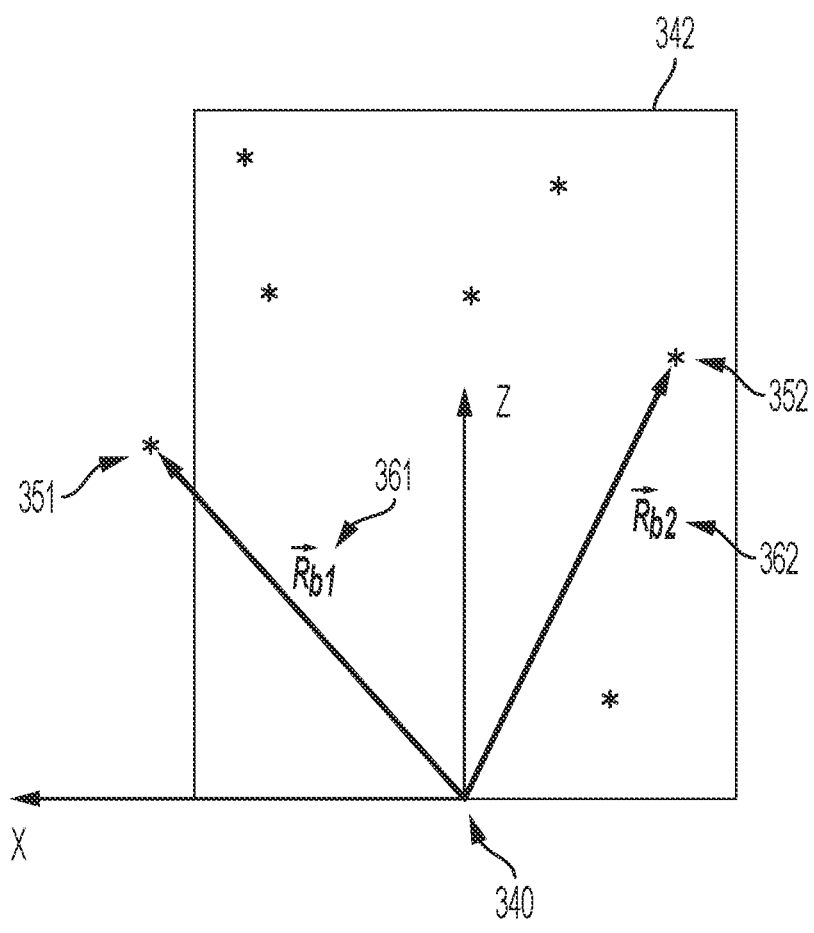
FIG. 3 illustrates pitch locations (i.e., ball-bat impact locations) for a set of swings in a vertical two-dimensional view, with reference to a strike zone.

The ball-bat impact location 223 in three-dimensional space for a swing may be interpreted in meaningful ways for a player or coach. For example, one may define a two-dimensional projection of the impact location 223 in the X-Z plane as the "pitch location". An example of such a view is shown in FIG. 3 where the pitch location 351 of a first swing is shown at the end of vector $\vec{R}_{b1}$ 361 and is shown as a projection onto the X-Z plane. The system may store this location for some or all swings, and the system may later output this location on a display with swing information as it relates to pitch location. By way of example, vector $\vec{R}_{b2}$ 362 shows the pitch location * 352 of another swing. For example, FIG. 3 shows similar two-dimensional projections of ball-bat contacts or pitch locations for a group of swings, where each indicator * is a different pitch location at a possibly different location in space. $\vec{R}_{b2} \vec{R}_{b1}$ The system may project pitch location to a 2-dimensional plane at a prescribed location, for example the center of home plate (depicted as 340 in FIG. 3) or at the front of home plate or at another Y-axis location. Alternatively, the system may extrapolate pitch location to such a plane along a ball flight path, either a predetermined path or a path that is obtained by measurements of ball flight.

In addition to pitch location in a vertical plane, one may wish to understand where the ball was located in a horizontal plane. In this view one may consider the Y dimension to be "depth of contact", in other words how far back in the hitting zone contact is made with the ball, where the hitting zone is referred to as the general space around home plate in which the player may make contact with a ball. (The term "hitting zone" may be extended to other areas in other sports, such as a general space around a golf tee in golf.) In baseball, the hitting zone is typically larger than the strike zone, as players may swing at and make contact with pitches that are not strikes. The hitting zone extends in three dimensions above home plate. An example of such a view of pitch locations in the hitting zone as compared to a smaller strike zone is shown in FIG. 3 where strike zone 342 is represented by a bounding box. Pitch location 351, shown at the end of vector $\vec{R}_{b1}$ 361 is shown as a projection onto the X-Y plane and is outside the strike zone. This shows that the batter swung and contacted a ball in an area of the hitting zone that is outside of the strike zone 342 at pitch location 351. On the other hand, pitch location 352 and all other illustrated pitch locations are within the strike zone 342.

The location information shown in FIG. 3 provides the basis for presenting graphical information to the user in terms of contact location and/or location of pitches in three-dimensional space. This information may be useful to a hitter or coach in that individual swings or trends about the player's swing patterns may be related to pitch location and contact point location as opposed to simply treating all swings similarly, which is common practice currently.

A particular metric that is of interest to players and coaches is barrel slot 222, an example of which is shown in FIG. 2. The system may identify a barrel slot by first computing the trajectory of the bat in three-dimensional space, as shown in FIG. 2. Methods for computing the bat trajectory using motion tracking sensor or camera data are well known in the literature, for example see King, K., Hough, J., McGinnis, R., & Perkins, N. C. (2012). "A new technology for resolving the dynamics of a swinging bat," published in Sports Engineering, 15(1), 41-52, or U.S. Pat. No. 10,888,735 to Clark et. al., titled "Calibration of Initial Orientation and Position of Sports Equipment and Body Segments for Inertial Sensors," the disclosure of which is fully incorporated into this document by reference These methods use motion tracking sensor data to determine the changes in bat positions and orientation (and associated velocities) from a known or estimated or assumed location in three-dimensional space (or in the case of cameras, the bat positions and orientations versus time are determined directly from camera data and velocities are derived from that information). The system can use the three-dimensional trajectory of the bat to obtain the three-dimensional path that any point on the bat follows versus time during the swing.

For example, FIG. 2 shows the path 225 of a particular point on the bat along the bat's trajectory 221. In this example, the path 225 is called the bat barrel path, which may be a point at some fixed distance along the length of the bat, such as a location positioned at approximately 75% or 80% of the bat's length away from the knob. Alternatively, the barrel may be the mid-point of the bat (along its length), or the knob. or the tip of the bat. Using the methods referenced above, the velocity and acceleration of points on the bat versus time are also known in three-dimensional space. The system may use this information to derive many metrics about the swing. For example, the system may derive barrel slot 222 from the path 225 to be a vector in three-dimensional space that represents the path of the bat prior to some point of interest in the swing, such as the point of impact 223 of the bat with the ball. As such, the vector representing the barrel slot's length and orientation (defined by two angles defining its orientation in three-dimensional space) must be determined.

Figure 4:
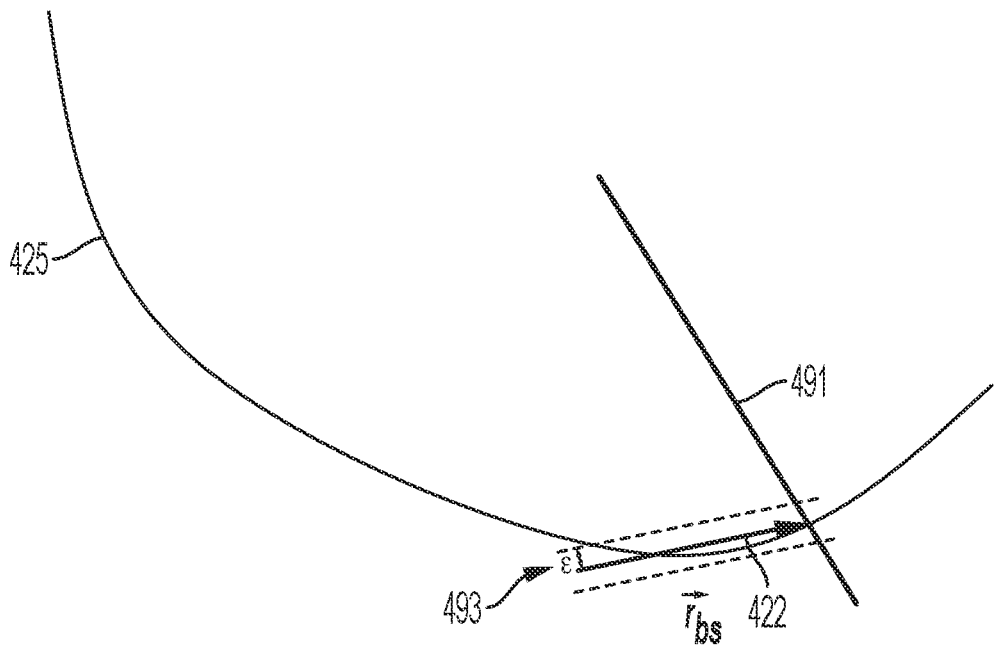
FIG. 4 illustrates a typical path of a point of interest on the bat and a barrel slot with annotations for how its orientation and length may be calculated.

These parameters may be calculated as depicted in FIG. 4, which shows a typical path 425 of a point on the bat in a 3-dimensional curve, which may represent path 225 of FIG. 2. Line 491 represents the bat (for example, the center longitudinal line of the bat or a line along the outer surface of the bat at a desired angle around the center line) at a particular point of interest during the swing, for example the instant of contact with the ball (impact point 223 in FIG. 2). Arrow 422 is the barrel slot vector (corresponding to barrel slot 222 in FIG. 2). The system may derive the barrel slot's orientation by linearizing a portion of the path 425 using now or hereafter known regression methods, which will produce a line segment at an orientation in three-dimensional space that may be defined as vector $\vec{r}_{bs}$. The tip of $\vec{r}_{bs}$ may be located at the point of interest on the bat, for example the measured or assumed contact point, and the length of $\vec{r}_{bs}$ may be defined as the longest straight line segment that may be derived from linear regression of the bat path curve so that no point on the line deviates from the curve by more than ε 493 shown in FIG. 4 in any direction perpendicular to that line segment where ε is a predefined distance such as a baseball diameter or half a baseball diameter or the bat diameter or 1 inch. The length of the barrel slot vector may be defined other ways, for example it may be a fixed length (for example three baseball diameters or six baseball diameters, or six inches) or it may be representative of the speed of that point or some other point on the bat at the desired instant in time.

Figure 5:
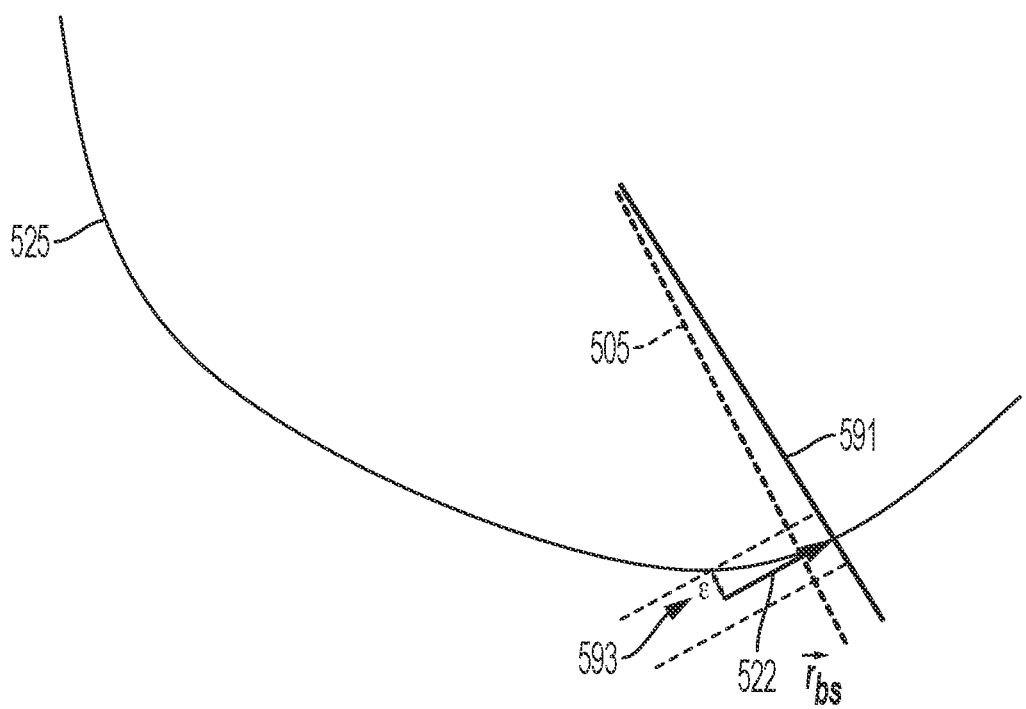
FIG. 5 illustrates a typical path of a point of interest on the bat and a barrel slot with annotations for an alternative method for how its orientation and length may be calculated.

Other definitions and associated algorithms for calculation of barrel slot parameters may be used. For example, FIG. 5 illustrates a barrel slot 522 that is perpendicular to the bat orientation 591 at the time of, and in the direction of, the corresponding point on the bat when at location 505 at a nearby time point (for example the most recent or the $5^{th}$ point prior to the point of interest or the next point in time or the $10^{th}$ point afterward) during the swing. Curved line 525 illustrates a typical three-dimensional path of a point on the bat during a swing. Line 591 depicts the bat at a particular point of interest during the swing, for example the instant of contact with the ball. Arrow 522 is an alternative barrel slot vector, $\vec{r}_{bs}$. The system may derive the orientation of the barrel slot vector by placing the tip of the vector at the location of interest on the bat line 591, and moving in the direction orthogonal to the bat line 591 to create a vector of known length (for example a length of 3 ball diameters or 6 ball diameters or 5 inches) or until the line segment representing the vector deviates by more than some value ε 593 from the bat path in any direction perpendicular to the line segment, where ε is a defined distance. such as a distance equal to approximately a baseball diameter, half a baseball diameter, the bat diameter, or 1 inch. Alternatively, the direction of the barrel slot 522 may be defined as being in the direction of instantaneous velocity of the point of interest on the bat at the time of interest during the swing.

Figure 6:
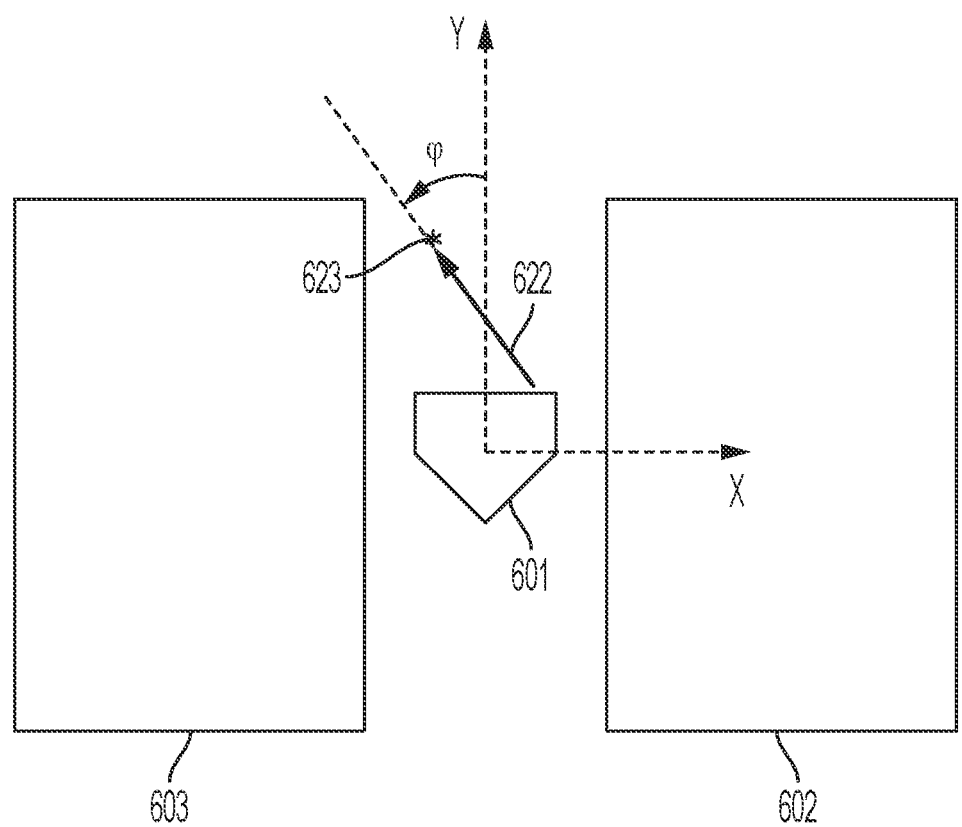
FIG. 6 illustrates an example two-dimensional projection of a barrel slot in a view from above the batter.

The angles that the barrel slot vector $\vec{r}_{bs}$ 522 make with respect to field frame coordinate axes in 3-dimensional space may be defined as the heading angle and elevation angle, although other geometric representations of that vector exists. These angles may be visualized with a 3-dimensional view or with projections of such a view on a display. For example, FIG. 6 shows a projection of an example barrel slot vector 622 in the vertical view (looking from above the batter, with a view of the plate 601 and the batter's boxes 602 and 603), where the angle φ may be defined as the heading angle. Defining the barrel slot 622 as the direction of travel of a point of interest on the bat prior to contact with the ball at the point of impact 623, then the heading angle is the direction of that travel in the two-dimensional (X-Y) plane of the field. In other words, it conveys to the player or coach the extent to which the bat is traveling toward the pull side or the opposite field side for that particular swing. The system could derive information from this directional information, for example the expected ball movement direction after impact with the bat.

Figure 7:
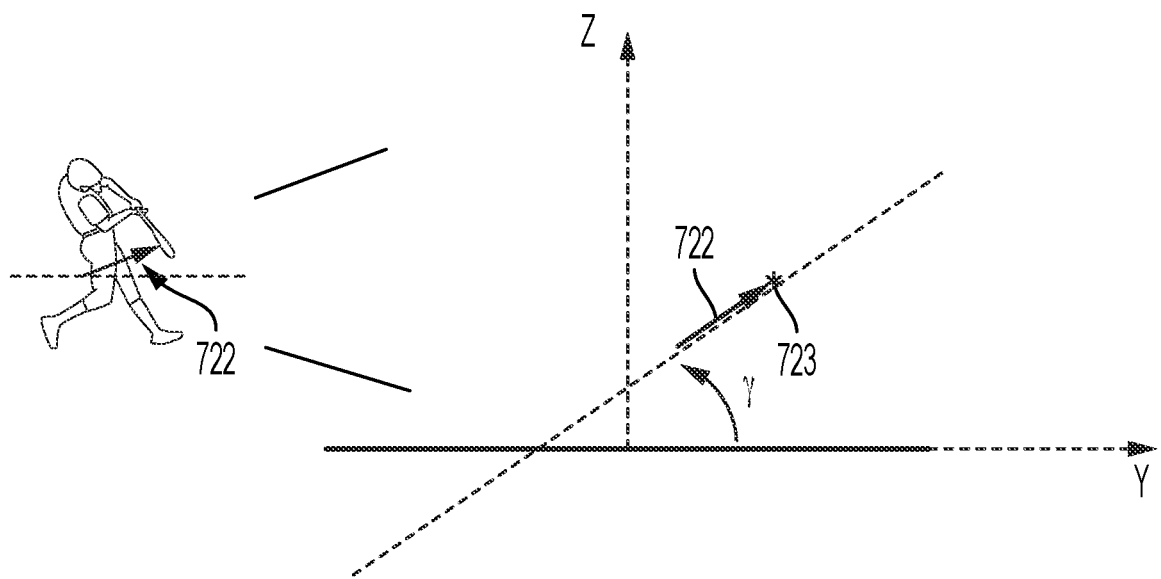
FIG. 7 illustrates the example two-dimensional projection of a barrel slot of FIG. 6 in a view from the side of the batter (e.g. the opposing batter's box).

In addition, the system may generate and display other views and associated projections of the barrel slot. For example, FIG. 7 shows a projection of an example barrel slot 722 vector to the point of impact 723 in the horizontal view (looking from the side of the batter, for example the opposing batter's box) where the angle γ may be defined as the elevation angle. In this view, the angle conveys to the player or coach the extent to which the bat is traveling upward or downward for that particular swing.

Any of the views described above may be used to display multiple barrel slots from multiple swings, thereby creating a swing fingerprint view for a player. For example, the system may choose to present a player's swing data associated with a certain set of past swings that have been stored in memory in the bat-mounted sensor, in a computing device communicatively connected with the sensor, or on a cloud-based remote server. The system may include a predetermined or otherwise specified number of swings in the swing fingerprint representation, such as the most recent 30 or 50 swings that the batter took, or the swings that the batter took during a specified time period such as the most recent 7 days or two weeks or month. Optionally, the system may provide a user interface via which a user may select multiple individual swings or a given number of sequential swings or swings within a given time period. Optionally, the system may only calculate and/or display a swing fingerprint representation if at least a threshold number of swings are available or chosen. For example, the system may require a threshold number of swings that is expected to portray a meaningful swing fingerprint representation, such as at least 30 or at least 45 in total, or at least 30 or at least 45 swings that meet one or more criteria, such as having impact velocity above some threshold such as 50 mph and/or having maximum acceleration below a threshold such as 25 g. In addition or alternatively, before generating a swing fingerprint representation the system may require data for a threshold number of swings in certain regions of the hitting zone (such as high inside, high middle, high outside, low inside, etc.), thereby providing meaningful coverage of pitch locations.

Figure 8A:
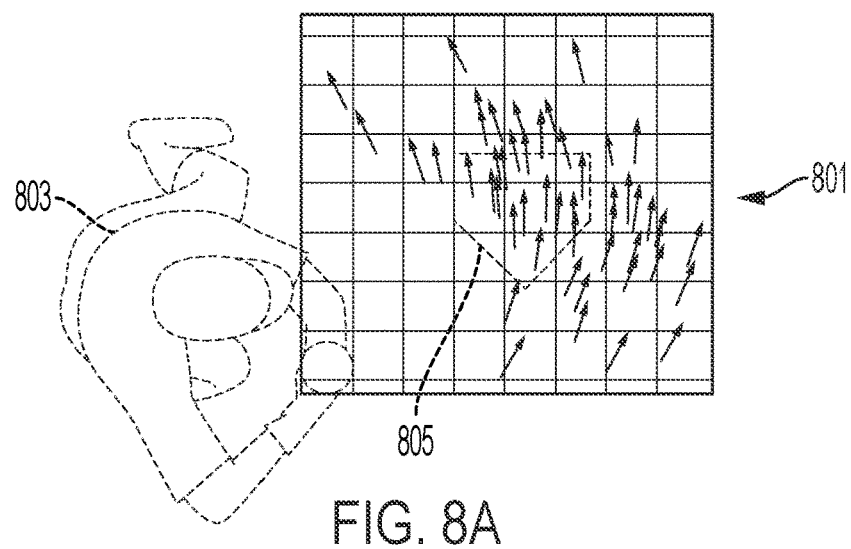
FIG. 8A illustrates an example overhead view of a swing fingerprint representation showing multiple barrel slot vectors that are associated with multiple swings.
Figure 8B:
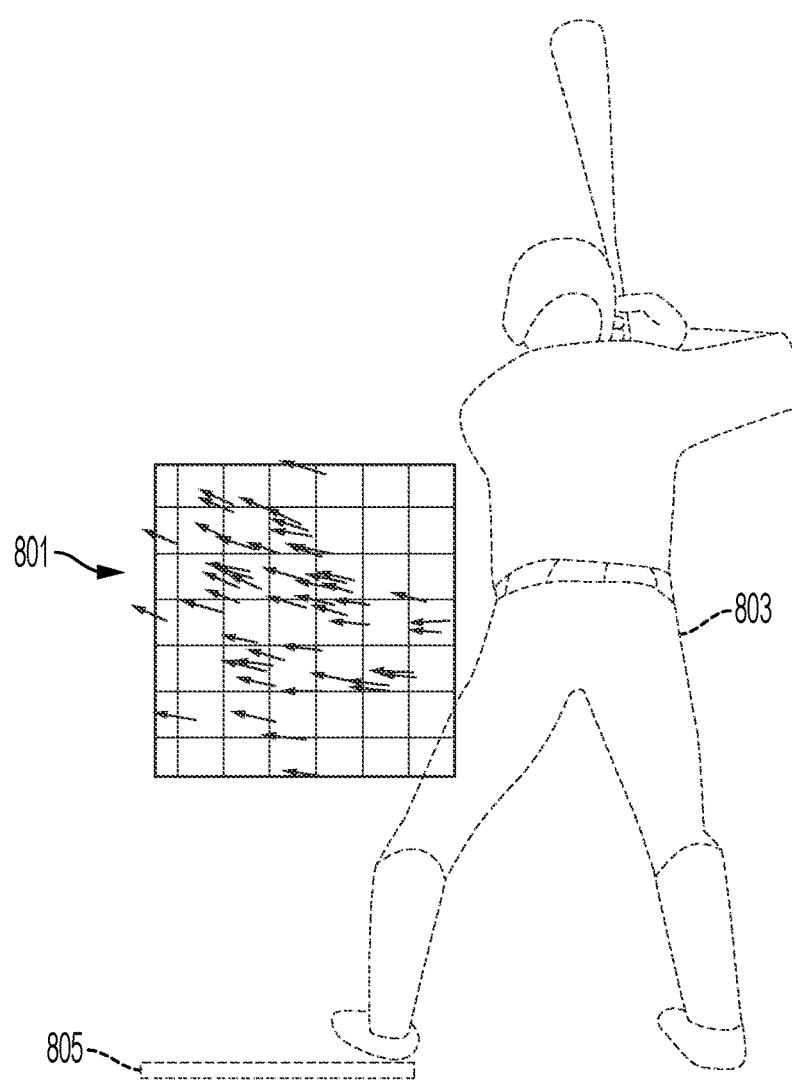
FIG. 8B illustrates a side view of the same swing fingerprint representation.

FIG. 8A shows an example overhead view of a player's swing fingerprint plot 801 for multiple swings. Each line segment represents the barrel slot of an individual swing, and the circle at the end of the line depicts the point of interest during the swing, such as the representative impact point where the bat contacted the ball. Each slot shown in the view of FIG. 8A is positioned to have a corresponding heading angle (i.e., an angle with respect to an axis in the horizontal plane that leads from home plate to the pitcher's mound, or the vertical axis in FIG. 8A). FIG. 8B shows the corresponding side view for the same swing fingerprint plot 801 for the same swings. Each slot shown in the view of FIG. 8B is positioned to have a corresponding elevation angle (i.e., an angle with respect to ground, or the horizontal axis in FIG. 8B). (In FIGS. 8A and 8B, the positions of the player 803 and home plate 805 in each viewing angle are also shown for visualization purposes, but these are not necessarily elements of the swing fingerprint representation.) From these plots, the player and coach can gain insights into the player's swing characteristics. For example, the "flow" pattern of vector directions as they change across the plot indicate the player's tendencies to pull the ball, or to hit the ball to the opposite field, or to direct the ball upward or downward, in relation to pitch location. In the example shown, the player tends to pull inside pitches and to direct outside pitches toward the opposite field. All pitch locations tend to have a positive elevation angle (upward angle of the barrel slot) but higher pitches have a slightly higher angle than lower pitches. Another aspect of the swing fingerprint representation that may be observed from the plots illustrated in FIGS. 8A and 8B is the variation in contact point location in space along the Y-axis (that is, from front-to-back of the hitting zone) as a function of pitch location. In the example shown in FIGS. 8A and 8B, the player tends to make contact further toward the back of the zone for outside pitches and further toward the front of the zone for inside pitches. The system may display the swing fingerprint plot from a variety of other views, including three-dimensional views. Optionally, the system may include a user interface via which the system may receive a selection of any of the views above from a user.

In some use cases involving a player practicing or training to improve his or her swings, the barrel slot information might be considered independently of where the ball is thrown or what type of pitch is being hit. For example, the system may collect swing motion data for a set of swings and calculate barrel slot information for all of those swings using the sensors and cameras described herein. These swings may involve hitting balls on a tee or balls that are pitched or from soft-toss or front-toss or other methods of offering balls to batters for hitting. For pitched or tossed balls, they may be different pitch types, for example fast balls, curve balls, sliders, etc., or they may be all of the same type. The swings may follow a repeated trajectory or location for hitting, or the trajectories and/or ball locations may vary within a set of data. When generating the swing fingerprint representation the system may implement rules via which it will ignore the pitch types, trajectories, and locations and present average information about all swings. For example, the system could calculate the average barrel slot angles, lengths, and speeds for all of a set of swings and present that average information. The system might also present all the data of barrel slot without regard to location, pitch type, or trajectory.

Figure 9:
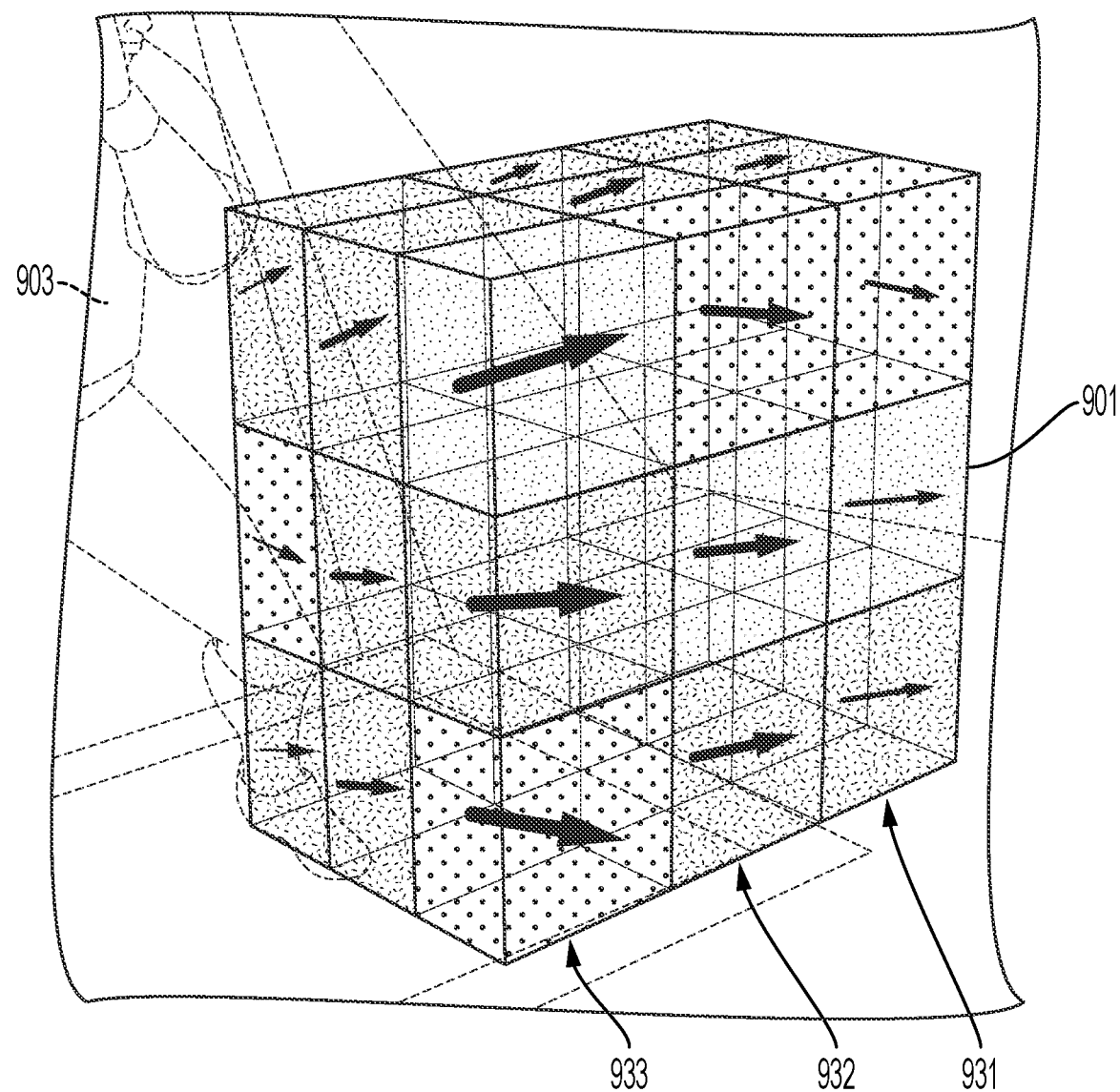
FIG. 9 illustrates a division of a hitting zone into 27 cube-shaped regions that may be used to express the swing fingerprint information in a three-dimensional visualization.

In addition, the swing fingerprint representation may include a measurement of the bat's speed at a particular point of the barrel slot, such as the point of impact with the target. The speed may be represented in the visualizations by various colors of the vectors or regions around the vectors, for example with one color representing bat speed that equals or exceeds a threshold value, and another color representing bat speed that equals or exceeds or is less than the threshold value. Additional colors may be associated with bat speeds that are within various ranges or thresholds. The thresholds or ranges may be predetermined, or they may be a function of the data set, such as in relation to the average speed for all swings of the data set. Multiple colors may be used for multiple ranges of values. FIG. 9 illustrates an example three-dimensional display of such data, in which the swing fingerprint representation 901 is shown near batter 903 with various regions of the strike zone or the hitting zone represented in different colors, each of which corresponds to a different range of bat speed values. (In the black-and-white image of FIG. 9, different colors are represented by different dot pattern densities.)

Figure 10:
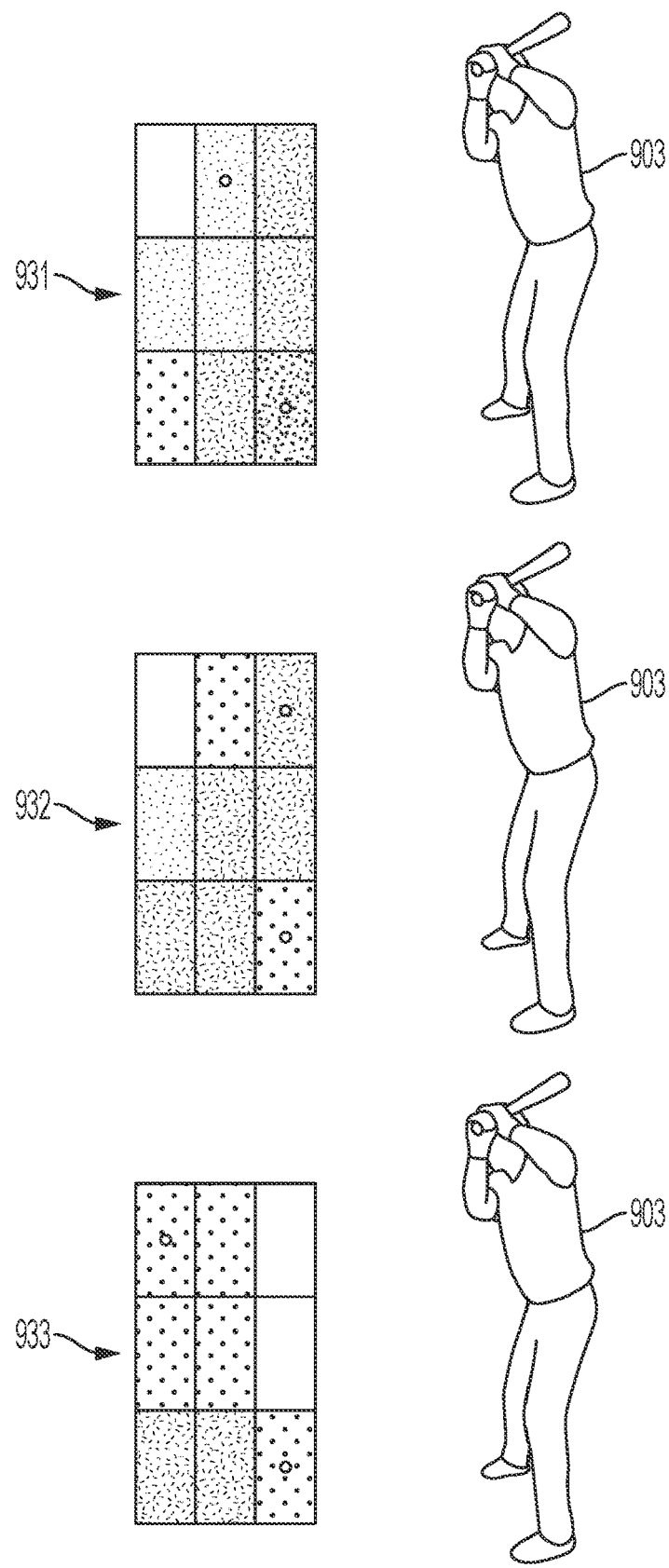
FIG. 10 illustrates the 27 regions of FIG. 9 as separate layers, front, middle, and back, in a two-dimensional swing fingerprint plot.

As an alternative to viewing the individual swing information, the swing fingerprint visualization may plot aggregated or average swing information as a function of pitch locations. For example, the system may divide the hitting region into a subset of smaller subregions, for example, 27 cube-shaped areas depicted in FIG. 9 in which there are nine contiguous subregions in a first layer 931 positioned at the "front" of the hitting zone (closest to the pitcher), nine contiguous subregions in a layer 932 positioned at the "middle" of the hitting zone (near the center of home plate), and nine contiguous subregions in a layer 933 positioned at the "back" of the hitting zone (closest to the catcher). FIG. 10 shows each of those layers 931-933 of nine regions shown individually in a two-dimensional view. Another way that the system may consider the 27 regions in the example shown in FIGS. 9 and 10 is a first layer with nine regions on the "inside" of the hitting zone (nearest to the batter), a second layer with nine regions in the "middle" of the hitting zone (near the center of home plate), and a third layer with nine regions on the "outside" of the hitting zone (nearest the opposite batter's box from the batter). In such an arrangement batter 903 may be positioned below or above the layer in the two-dimensional plot of each layer. A third way that the system may consider the regions is a first layer with nine regions at the "high" part of the hitting zone, a second layer with nine regions at the "middle" of the hitting zone, and a third layer with nine regions at the "low" part of the hitting zone. Other numbers, shapes, and locations of spatial regions and layers may be considered in various embodiments.

Using this terminology and division of regions, for example front-middle-low, the second (middle) and third (low) descriptors describe the pitch location (middle of the hitting zone, low in the hitting zone) and the first descriptor (front) describes the point of contact (front of the hitting zone) for those types of pitches. Using this method of depicting swing information, a player or coach may understand player swing performance on the basis of general pitch location such as front-inside-high, or back-outside-low. That is, the plotted barrel slot information, as depicted in FIG. 9 or 10, may be interpreted to help understand differences in swings for different swing locations. For example, a player may tend to have higher bat speed or may tend to push the ball to the opposite field for low-outside pitches and may tend to exhibit slower speed and pull the ball for high-inside pitches. Furthermore, any region in which no contact was made (that is, for the set of swings for a variety of pitch locations, the batter may not have a point of contact in some of the 27 regions, for example the front-outside-low region) would be empty of barrel slot indicators. This suggests that for pitches in that location (for example outside-low) the player does not tend to make contact toward the front of the hitting zone (presumably for those pitches, the barrel slot indicators will appear in a different region for those pitch locations, either at the middle or back of the hitting zone). The swing fingerprint representation or any of its regions, for example in FIGS. 9 and 10, may be illustrated to indicate that no contact occurred in those regions, such as by leaving the region blank as shown in some regions of FIG. 10.

All the barrel slots for all swings included in a swing fingerprint representation may be included in a swing fingerprint visualization, as shown in FIGS. 8A and 8B. Alternatively, none of the actual barrel slot vectors may be included and colors of each region may be used instead to indicate quality or magnitude of the barrel slot. In still another visualization, the system may aggregate barrel slot data for each given region and plot a single aggregated vector in each region, as depicted in FIGS. 9 and 10.

To aggregate swing information for a specific region, the system may, for example, compute the average of a particular metric for all swings corresponding to pitch locations within that region, such as the average elevation angle or average bat speed for swings within each of the 27 (or other number of) regions. Another way by which the system may aggregate swing information is to include swings that correspond to pitch locations within a given region plus those that overlap the neighboring regions by some amount, such as two inches or one baseball diameter, which can have the effect of smoothing the data across regions. Showing aggregate or average metric information for multiple regions simplifies the data display to the player or coach while still providing useful information.

Although the example swing fingerprint representations shown in FIGS. 8A, 8B and 9 represent motion of the object, the system could also develop a swing fingerprint data set and display a swing fingerprint representation for a body part of the player. For example, instead of determining a slot that extends outward from the bat-mounted motion sensor along the bat, the system could determine a metric of body motion as the player swings the bat (for example an aggregate measure of body movement such as mechanical efficiency, or individual metrics such as hip rotation, hip-shoulder separation, trunk tilt, stride length, head movement, knee flexion, back elbow position, front elbow flexion, or timing of foot plant or any other key body movement, any of which could be determined at a particular time instant of the swing such as immediately prior to impact or at some time instant or period during the swing). The system may associate the metric with the pitch location for that swing. It could then display a swing fingerprint representation of the body motion metrics in two-dimensional or three-dimensional representations like the examples of FIGS. 8A, 8B and 9.

Example elements of the process for creating a swing fingerprint representation are described in FIG. 11, which is a flowchart of a possible sequence of operations for obtaining swing fingerprint data using the system shown in FIG. 1 and/or other system elements that will be described below in the context of FIG. 15. Some of the steps in FIG. 11 may be optional, and the steps do not necessarily all need to be performed in the order shown. For example, step 1108 could be performed before step 1107, and step 1106 could be completely or partially performed before steps 1102 and 1103.

Figure 11:
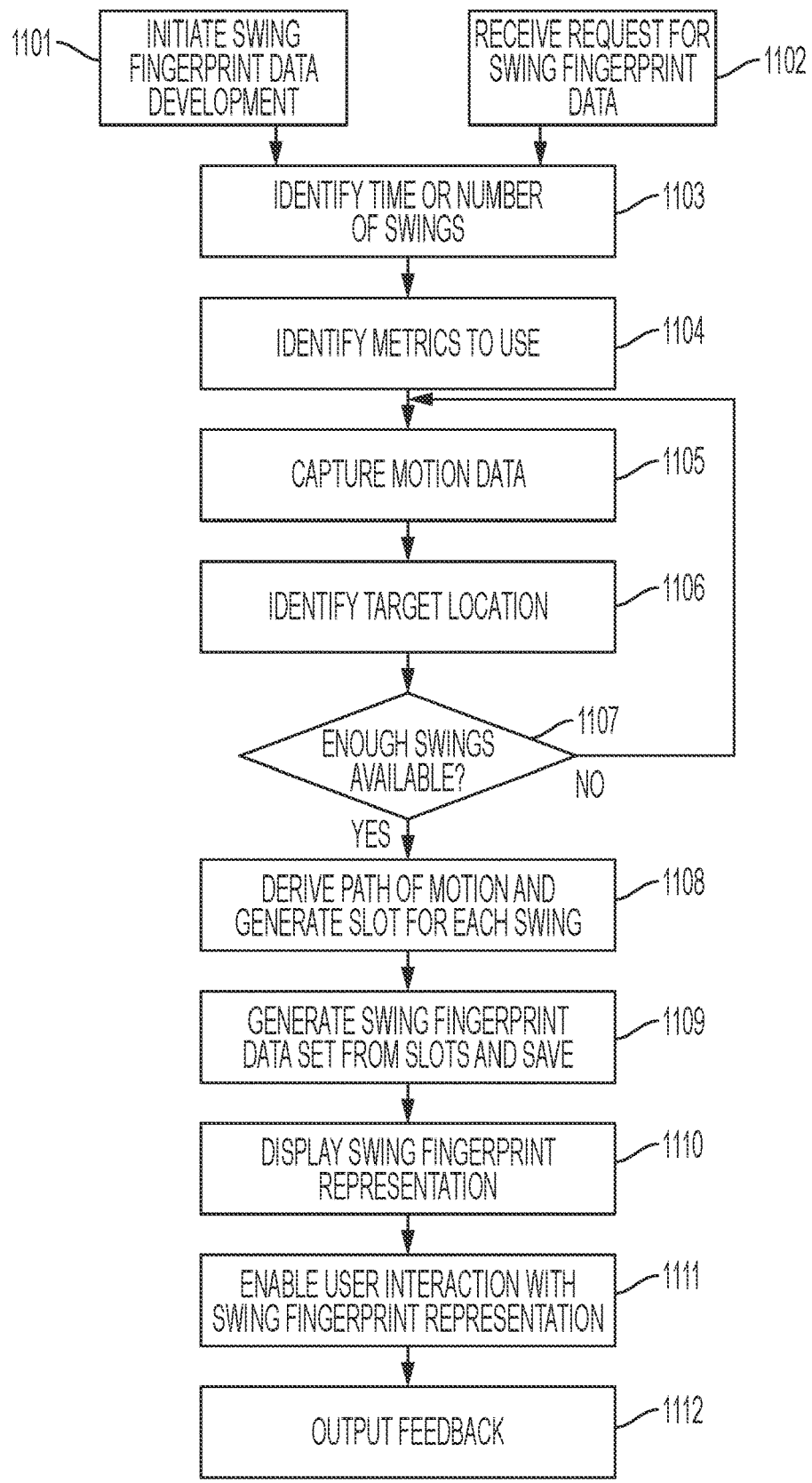
FIG. 11 shows an example flowchart of the process that the user and system could follow in creating and using a swing fingerprint analysis.

In the process of FIG. 11, the system may initiate generation of a swing fingerprint data set for a swing fingerprint representation at 1101 in response to one or more triggers, such as by receiving swing data from a motion detection sensor that is attached to a bat. Alternatively, a user may submit a request to generate a swing fingerprint representation and the system may receive the request at 1102. Either way, at some point in the process the system will receive or generate an identifier for the player who is using the motion sensor (such as sensor 114 in FIG. 1) so that it saves the swing fingerprint data to the player's stored profile. Optionally, the system may retrieve existing swing data from the stored profile to use in generating the swing fingerprint representation; alternatively or in addition, the system may capture new motion data from the motion tracking sensor (camera and/or IMU) at 1105 and use the new data to generate the swing fingerprint representation.

When capturing the motion data at 1105, the system may capture swing data that it will use to derive a path of motion for each of the swings. The system also may capture a location of the target at 1106, where the location represents the location of the point of impact of the target (the ball) with the swinging object (the bat) or the pitch location, and optionally also a path of motion of the target toward the swinging object before reaching the point of impact. The system may derive the location of the target from the motion data (such as at a location at which there is a sudden change the bat's acceleration), or obtain the target location from other data. From this data, the system may derive the path of motion and generate a slot (i.e., a barrel slot) within the path of motion for each swing at 1108, using processes described above.

At 1103 the system may identify a threshold time period or number of swings that are required to generate a swing fingerprint representation. These thresholds may be stored in a data set or one or more rules, received from a user, or otherwise generated. Steps 1101 and/or 1102 may be triggered by the collection of at least the threshold number of swings, or the passage of the threshold time period during which swings are captured, or some other triggering event. Alternatively, prior to calculating and displaying a swing fingerprint representation, at 1107 the system may check to ensure that a sufficient number of swings exist, and/or the swings represent a sufficient number of pitch locations, or pitch types, or that one or more other parameters are satisfied (examples of which are described above). If a sufficient number of swings does not exist (1107:NO), or if other parameters are not satisfied, the system may prompted the user to use the bat and sensor to generate more motion data for more swings at 1106, possibly with specific instructions as to how to address the shortcoming. Once enough swing motion data exists and/or a prompt is provided by the user or by the system to create a swing fingerprint representation (1107:YES), then the system will generate the swing fingerprint data set and save the data set to a data store at 1109. The system may save the data set as a new data set for the player, or as an update to an existing data set that already exists in the data store for the player. At 1110 the system will output a swing fingerprint representation, which is a displayed visualization of the swing fingerprint data set, on a display device.

At 1111 one or more user interactions may be prompted or enabled by the system, such as allowing user manipulation of the graphic visualization of the swing fingerprint representation (such as visualizing certain regions or layers, or showing metrics using different means and graphical elements) as described in more detail elsewhere in this disclosure; enabling recalculation of the swing fingerprint representation for different metrics and/or a different or modified set swings; incorporation of two or more metrics into the swing fingerprint visualization; comparison of two or more swing fingerprint analyses and/or visualizations for a player using swings from different time periods or selected using other means; comparison of one player's swing fingerprint to that of one or more different player's; sharing the results of the swing fingerprint data or visualization or both to another person or computing device; saving the swing fingerprint analysis results and/or visualization for later use or viewing; requesting feedback and/or insights about the player's swings for improvement or game play strategy.

The user interface that displays the swing fingerprint visualization may have user interaction features such that the user may be able to rotate the display to see the swing fingerprint plot from multiple angles, or certain regions or groups of regions may be turned on or off by the user, or the user may be able to select the visible metric indicators for all swings or just the aggregated indicators for regions, or the user may be able to adjust which metric indicators appear based on a threshold that is chosen by a selector such as a slider on the touch screen of the computing device. For example, the system may include user interaction functions that allow a player to choose to show all swings or all swing fingerprint regions in which the bat speed is above or below a threshold, such as 70 mph; or for which the elevation angle or any other metric is above or below a threshold, such as 10 degrees. In another example, the player may choose to show all swings or all swing fingerprint regions in which the barrel slot alignment with a given pitcher's pitches or pitch types is within or outside of a certain threshold, say +/−10 degrees.

Optionally, at 1104 the system may prompt the user to identify, or the system may automatically identify, one or more additional metrics (besides or in addition to the barrel slot) to be calculated and presented in the swing fingerprint representation. Such other metrics may be derived from the measured data for three-dimensional bat motion, ball motion, or motion of the batter's body for analysis and/or display in a swing fingerprint representation. For example, the time from initial motion to some desired point in the swing, such as the "trigger-to-impact time" may be calculated where "trigger" may refer to the start of the swing. Another example metric is the maximum distance the knob of the bat travels in a certain direction, for example along a field-frame axis such as the X-axis described above, which may be called "hand cast" and which measures the maximum distance the knob travels from a reference point such as the starting point of the swing. Many other metrics related to the bat motion may be used in the swing fingerprint, such as forces and torques applied to the bat during the swing, the momentum of the bat during the swing, the energy of the bat during the swing, the power applied to the bat during the swing, the acceleration, velocity, position, of any point on the bat during the swing or angular acceleration, angular velocity, angular position of the bat during the swing, and the components of any vector quantity used to represent the swing motion in any reference frame.

A swing fingerprint representation may be analyzed and presented in terms of a metric not derived from bat motion but still related to the swing. For example, the system may display a swing fingerprint visualization in terms of hip rotation, or hip-shoulder separation, or foot placement, or trunk axis orientation, or arm movements, or other metrics related to the body motion during a set of swings, as derived from camera data or wearable sensors. Likewise, the system may display a swing fingerprint visualization in terms of other metrics such as forces measured by force plates, ball-bat contact information as determined from videos or alternate sensors (e.g. strain gages on the bat), force or torque information between hands and bat (as derived from force sensors in the bat handle), or head or other body movement as determined by wearable sensors on the player, or ball flight information or bat-ball contact or timing information, or pitcher movement or timing information.

A player or coach may wish to know how one or more of these metrics vary as the player swings at different pitch types or different pitch locations. One may use a similar graphical display of any of these metrics in relation to pitch location, including vectors or line segments or bars or other shapes or colors as appropriate for the metric being displayed. For example, a swing fingerprint visualization that presents the trigger-to-impact-time metric as the variable of interest may plot line segments or bars whose lengths or colors illustrate the magnitude of the trigger-to-impact time, in milliseconds, and their locations correspond to the location of the pitch associated with each swing. By viewing a set of swings, the player or coach may infer characteristics to the hitter for that particular metric and how that metric varies with respect to pitch location.

A coach or player may use the information conveyed in a swing fingerprint representation's display of metrics to develop a hitting strategy for that particular player, for example, a "hitting approach". In such a strategy, a player may choose to selectively swing only at pitches for which his or her swing performance is good and to avoid swinging at pitches for which he or she does not perform well. Another use for this information is to enable the player or coach to understand what areas of the hitting zone (which pitch locations) would the player most benefit from focusing on for practice and training. In addition, at 1112 the system can provide and output feedback such as insight into what improvements could be made with respect to what pitch locations. These areas of improvement may be conveyed to the user through a display or audio output, in a transmitted email or text message, or in a software application on the user's electronic device. For example, the system may determine a player's weakest and strongest areas (in terms of pitch location) or rank any or all areas of performance for any metric, and the system may convey that information to the user.

In addition, the player or coach may use the results to obtain specific insight into how to adjust the player's swing or body motion or timing for a specific swing location or locations. For example, if the player is not performing well when hitting outside pitches near the front of the hitting zone, a coach may instruct the player to wait longer to swing, thereby making contact further toward the back of the hitting zone (nearer to the catcher). In another example, the swing fingerprint results may show that a player's bat movement may be directed toward the opposite field when hitting inside pitches, so based on this information as observed in the swing fingerprint visualization, a coach may instruct the player to change the path to pull the ball instead. Or the player's bat movement may be upward (a positive elevation angle) for high pitches but downward (negative elevation angle) for low pitches, so a coach may instruct the player to change his or her elevation angle for either the high or low pitches. In any of these examples, the feedback may be provided through videos or written communication or verbally within the software application, and may include tips, drills, and/or training exercises to achieve the goal, and may require user input or may be automated. For example, the software may analyze the swing fingerprint, and based on predetermined rules may offer suggestions for swing adjustments to improve the player's performance over a greater portion of the hitting zone.

The system may transmit or display the feedback provided at step 1111 to a player or coach, either automatically or through request by the user. The system may analyze the swing fingerprint representation for a player with the intention of providing feedback to the player, coach or other authorized users. For example, the analysis that the system may perform may include searching the metrics for all pitch locations or regions in the hitting zone, and identifying characteristics of interest based on the swing fingerprint data (for example elevation angles, barrel speeds, or heading angles).

For example, the system may select feedback from a table of candidate feedback messages, such as shown in FIG. 12. The system may provide summary feedback for the general swing fingerprint analysis, or it may provide specific results related to good and bad areas of performance, or it may provide a combination of these types of results. The table in FIG. 12 shows a portion of a larger table with example candidate feedback messages 1205. The feedback algorithm may review the swing fingerprint data, for example the barrel slot vector information, and assess whether the information includes general trends. For example, the system may select a metric 1202 such as heading angle and/or elevation angle. If the majority of swings (above some threshold such as 55% or 70%) have positive heading angles or negative heading angles or heading angles above or below some threshold (for example greater than 20 degrees or less than −10 degrees), then the system may select feedback from the row of the table in which the values corresponding to those values of that metric. Another example is that the system may assess general patterns in elevation angle, looking for patterns such as the majority of swings being above or below some threshold. Another example is to look for trends in barrel speed or length of barrel slot, or any alternate metric related to the player's swing or body movement or ball-bat interaction or timing that may be the basis for the swing fingerprint. The system may assess many combinations of characteristics and trends in the data, such as those described here or others, in determining what feedback to provide. The first column (Condition) 1201 of information in the table in FIG. 12 indicates conditional feedback for the general swing fingerprint (for example, summary of results, good characteristics of the results, poor characteristics of the results, etc.). The second column (Metrics) 1202 indicates the metric of interest, for example Heading angle, Elevation angle, or barrel Speed in this example. The third column (Mean) 1203 represents the trend. For example, if the majority of Heading angles are negative then the Oppo selection is appropriate and for example if the majority of Elevation angles are near zero then the Flat selection is appropriate. The final column (Sentence) 1205 presents an example statement that may be automatically presented to the user through either verbal or written feedback. The algorithm may provide multiple feedback statements for a condition (such as Summary) that relate to multiple metrics, or it may select a limited number of metrics for which to present feedback, dependent on predetermined thresholds or conditions for selecting metrics.

In some cases, a given metric may present a trend but there may be significant variation. For example, if the variation, typically measured by standard deviation 1204, of a given trend is above some threshold, for example 25% of the max value or 30% of the range of values such as 15 degrees or 10 miles per hour, then the algorithm may choose to select the Inconsistent row in the table for feedback. Alternatively, if the metric data has low standard deviation, as defined similarly, then the Consistent selection may be made.

One may further or alternately characterize the batter's swing characteristics based on the pattern of swing fingerprint metrics in terms of different regions of the hitting zone or in terms of pitch locations. For example, the algorithm may provide feedback based on a Condition such as what the player does well (noted as Good in the Condition column 1201 in FIG. 12) or Poor (not shown in the table excerpt of FIG. 12) or some other condition. The associated feedback provided to the player or coach may be selected by assessing the swing fingerprint representation by regions to find the best region or regions and/or the worst region or regions, such as the region(s) with the highest barrel speed or the region(s) with the elevation angle within a certain range that is considered to be good (such as 5 to 15 degrees) or alternately the region(s) with the most negative elevation angle or the region(s) with the lowest speed. For example, to select the feedback sentence(s) the system may employ an algorithm that looks for data that exhibits extremes or that exceeds thresholds on the basis of any combination of Condition, Metrics, Mean, and Standard Deviation.

Figure 13:
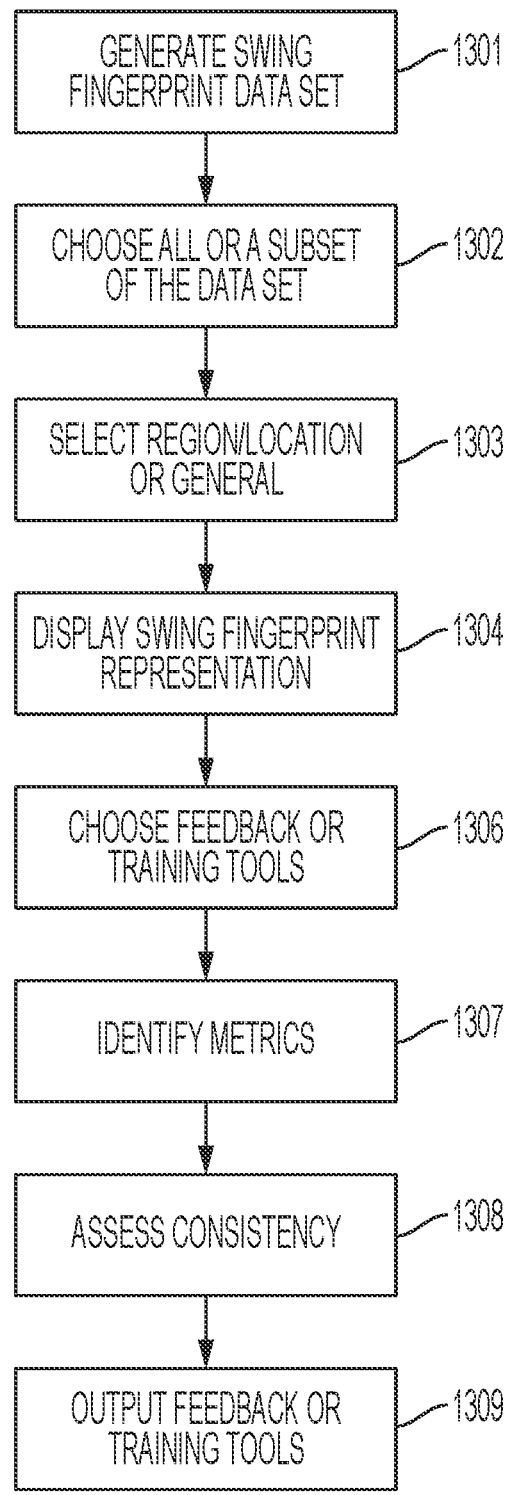
FIG. 13 is a flowchart describing a process by which the system may present feedback and/or training information to a user.

Additional ways that the system may display and assess the swing fingerprint representation are depicted in FIG. 13. After the system generates a swing fingerprint data set at 1301 using processes such as those described above, at 1302 the system may select (or receive a user selection) of whether the system should assess and/or display all or a subset of the swing fingerprint data. For example, a user may desire to see a visualization of only "good" or "bad" slots, in which good can be defined as any slot that satisfies one or more specified parameters, and bad can be defined as any slot that does not satisfy the parameters. For example, one or more of the regions may be assigned a minimum threshold bat speed and a desirable range of elevation angles. Any swing in which the slot satisfies those parameters may be included in the "good" subset; swings that do not satisfy those parameter may be assigned to a "poor" subset. Multiple levels between a highest and lowest level may be assigned, and different parameters, thresholds and ranges may be used.

At 1303 the system also may automatically select, or a user may select, one or more regions (e.g., locations in the strike zone) to display and/or consider in the analysis. For example, a user may choose to view and assess data corresponding only to swings in a lower portion of the strike zone, or only to swings that are in the center of the strike zone.

If no subset or region is selected, at 1304 the system may include the entire data set in the displayed swing fingerprint representation. If a subset or region is selected, then at 1304 the system may include only data for the selected subset and/or region in the swing fingerprint representation.

In addition, at any point in the process, at 1306 the system may determine, or the system may receive a user selection of, whether to generate feedback, training tools or both. Example feedback that the system may generate are shown in FIG. 12, and the system may select and display only feedback that corresponds to a selected subset or region of the data. Training information may include information about training tips and tools (such as, for example, blog posts, diagrams, drills, videos, or other media or information related to training that the player may follow in order to improve upon the specific swing characteristic). Further, at 1307 the system may perform checks on one or more identified metrics within the condition of interest, decide how to assess and present information on the basis of pitch location or region, assess the consistency of the metric at 1308, and then present the information at 1308 whether in feedback form or suggestions for training, or a hitting approach for game strategy or any combination of these.

The sequence of steps shown in FIG. 13 may be altered such that some or all of the steps are re-ordered. For example, step 1306 may occur before steps 1302 and/or 1303, and the system may later re-perform step 1306 in response to the output of steps 1302 or 1303. In addition, any of the steps (other than steps 1301 and 1306) are optional and may be omitted in various embodiments.

An alternative use of the swing fingerprint information is to determine how a player may perform against a particular pitcher, or to help a player create a strategy for hitting against a particular pitcher, or to help a coach determine how to select a batting lineup (that is, the players and their hitting order in a game) for a game against an opposing pitcher. When the swing fingerprint visualization is displayed showing a player's barrel slot metrics, it represents the natural pattern of motion vs pitch locations across the hitting zone. To maximize ability to make good contact with the pitched ball, one may choose, for example, to try to align the swing motion with that of the pitch trajectory.

The system may generate pitch trajectory information (using processes that are beyond the scope of this disclosure) or receive that information from a variety of external sources, For example the PITCHTRACKER™ system from Diamond Kinetics, Inc. is an example of a system that can that produce information related to the trajectory of a pitched baseball. Other systems that may generate such data are available from TrackMan A/S, Rapsodo Pte. Ltd. and Yakkertech LLC. This data may be plotted as depicted by way of example in FIG. 14, which illustrates an overhead view 1401 and a side view 1402 of the paths of various pitches from release from the pitcher's hand until the pitch crosses home plate. In order to maximize opportunity for making good contact between the bat and the pitched ball, the player may try to create a swing pattern in which the bat path aligns well with the pitch trajectory, or the player may use this information to better understand what pitches their swings align well with. For example, in the overhead view 1411 of the batter's swing fingerprint, swings in the in upper-right oval region align well with sliders, whereas swings in the centrally-located oval region align well with fast balls. Swings in the lower left oval region do not align well with any pitches. In the side view 1412 of the swing fingerprint, swings in the oval region align well with most pitches. For swings in the regions that align well, the player has more margin of error of making good contact than in the regions of poor alignment in which timing of the ball-bat collision must be more precise. Different types of pitched balls follow different paths. For example, fastballs tend to drop less than balls without spin because of their backspin; curveballs tend to drop more than fastballs or balls with no spin because of their top spin; other breaking pitches have side-to-side movement that when coupled with varying amounts of top- or backspin cause the ball to move in a variety of directions along its free-flight path. While the movements described here are the general types of movements of different pitch types, different pitchers can produce more or less movement for each of the various pitch types. More skilled pitchers may produce more movement on a given pitch than others, thereby making the pitch more difficult to hit. In addition, pitchers may have preferences or tendencies to throw certain types of pitches to certain locations in the hitting zone.

From a pitcher's perspective, the combination of pitch movement (for a specific type of pitch) can be combined with pitch location to make certain pitches even more effective. This can be observed by comparing a pitcher's ball movement and location tendencies with a batter's swing fingerprint (specifically, for example, the swing fingerprint in which barrel slot is plotted as the metric of interest). For certain pitch locations, the batter's swing path near contact aligns well with the pitcher's pitch trajectories for certain pitches, and not very well for other pitches. By understanding this relationship, a given batter may use that information to better prepare for a pitcher by knowing what pitch locations and/or pitch types are better suited for his or her swing type. Alternatively, a batter may use this information to better understand how to improve to be more effective against a given pitcher, pitch location, or pitch type.

Optionally, as discussed above in the context of FIG. 13, the system may deploy one or more algorithms to analyze the batter's swing and automatically provide insights to the player based on how their swing patterns align with a specific pitcher's pitch types and/or pitch locations, or the insights may be related to general pitch types and locations for a group of pitchers such as typical or average pitchers for a given age group or player peer group. For example, the metrics of interest that the system may display in the feedback (at step 1309) may include one or more metrics related to swing alignment with pitches, and the associated swing fingerprint analysis and player feedback may be related to these metrics. A pitcher's pitch movement patterns, including trajectory angles and locations as the pitches reach home plate, may be stored in memory for access by the software application. These may be for a specific pitcher or for general pitcher tendencies for a group of pitchers, for example for a certain age group or league or team. The system may compute a player's swing fingerprint based on barrel slot or another relevant metric, and may search the pitcher's pitch trajectory tendencies for areas of alignment between the player's swing patterns and the pitcher's pitch trajectories. The search may be done with respect to pitch location of the hitter's swing fingerprint. The resulting comparison of alignment may be presented to the user, showing the pitch locations and pitch types of best alignment, or worst alignment, or a ranking of alignments, or pitches for which the alignment is greater than or less than some threshold (for example the angles align or do not align within 5 degrees or 10 degrees), or a plot of pitch locations to be chosen or avoided based on amount of alignment that may be predetermined by some threshold or may be a user-selectable threshold. Alternatively, the software application may use the calculated information to select a drill or practice routine from a library of drills, or it may select a video of drills or tutorial information to show to the player for the purpose of improving their performance for the pitches or pitch locations for which the player's performance or alignment is below some threshold.

A coach may choose to utilize the swing fingerprint for multiple players on a team to determine a batting lineup, for example to select which players to play against a certain hitter or to select the order of hitters for a game. For example, the software application may analyze the swing fingerprint for a group of players, such as with the barrel slot metric, and the software may calculate a ranking of hitters within that group in terms of their swing alignments for that given pitcher. For example, the average deviation in alignment angles of barrel slots for pitching locations may be an aggregate metric for a player with respect to a certain pitcher. The software may calculate this metric for all players in a group and rank them for a coach to use in choosing a batting lineup.

A given swing fingerprint plot may be used to understand a player's performance at a given point in time, for example on a given day or at a certain point in the season or off-season. It may be useful to compare a player's performance over time and use differences to make recommendations about training and game strategies. The swing fingerprint plot may be used as the basis for such recommendations. For example, the swing fingerprint may be calculated for a given player on a certain date, or using swings from a range of dates, and the information may be stored in memory on the computing device or on an internet server. At a later point in time, a new swing fingerprint plot may be calculated using new swing data, for example more recent data. The metrics of interest in the swing fingerprint, which may include multiple metrics as described herein, may be used to discern differences in the player's swing characteristics from one set of data to the next (for example from one time period to the next). Such differences may indicate improvements in performance or degradation or a combination of improvements in some metrics or locations of the swing and degradations in others. The methods described above for presenting the metrics may be used. For example, side-by-side swing fingerprint visualizations may be provided corresponding to before-and-after comparisons. Alternatively, the comparison may be done with a single swing fingerprint graphical visualization by incorporating two or more different types of symbols, such as one color or shape for "before" and another for "after." Comparison of different swing fingerprints may be done manually, based on user selection of swings and time periods, and/or selecting metrics and displays of interest, or it may be done automatically.

In addition to comparing different swing fingerprint data sets for a player over time or under different conditions, one may wish to have the system compare swing fingerprint data sets for two or more players. For example, one player (Player A) may achieve certain on-field performance results, such as a high percentage of extra base hits or high percentage of success against a certain pitcher or type of pitcher. A coach or player (Player B) may use the swing fingerprint analysis to investigate what characteristics of Player A's swing might be lacking in Player B's swing that may enable Player B to achieve similar on-field results. Such an analysis and/or presentation of feedback may be done manually by user inputs or may be automated using algorithms and software that looks for metrics and pitch locations in which one player's swings are close to the other player by some margin (for example the elevation and heading angles for a given pitch location are within 5 degrees on average) or alternatively for metrics and pitch locations in which one player's swings are different from the other player by some margin (for example, the barrel speed for a given pitch location is more than 6 miles per hour different).

A further example of using the swing fingerprint for player comparison is in recruiting and scouting. For example, representative swing fingerprint results for multiple players may be computed and/or stored in memory on a computing device or server, forming a database of player information. A coach or recruiter or scout may identify a particular player or players and then search for players who exhibit similar swing fingerprint characteristics on the basis of any metric of interest. For example, a coach may have observed good success with a certain type of player, either one who performs well in games or who is able to easily adapt and learn, so the coach may wish to find new players with similar characteristics. The coach may obtain a swing fingerprint data set or representation for a new player who is being considered, scouted, or recruited, and compare that swing fingerprint data set or representation to the player of interest and either by manual comparison or through an algorithm implemented by the system, an assessment of the similarity of the two players may be determined. For example the similarity may be an aggregate number characterizing how similar the underlying swing fingerprint data is between the two players. An example of such a similarity calculation that the system may use is the computation of a difference norm, D:

$$D = \sum_{i=1}^{27} (e_i)^2$$

where $e_i = m_{iA} - m_{iB}$ is the error (difference) between two metrics mi for Player A and Player B (the two players being compared) such that $m_{iA}$ is the metric of interest (such as barrel speed or heading angle or trigger-to-impact time) for Player A and $m_{iB}$ is the metric of interest for Player B and i denotes the hitting region. The metrics may be calculated using any of the individual or aggregate methods described herein. In the example calculation, the errors are summed across all hitting regions (following the example of 27 regions of the hitting zone as depicted in FIG. 9, although other region breakdowns may be used). Alternate norms may be use for comparison of two players, for example multiple metrics may be considered:

$$D = w_1 \sum_{i=1}^{27} (e_{1i})^2 + w_2 \sum_{i=1}^{27} (e_{2i})^2 + \ldots$$

where $e_{1i}$, $e_{2i}$, etc. represent the errors (differences) between the players for multiple metrics (such errors may be normalized or nondimensionalized to prevent skew of the results due to unequal units in the various metrics, such as comparing miles per hour to radians or degrees) and $w_1$, $w_2$, etc. represent weightings (which may be user selectable or predetermined in the algorithm) to provide tuning of the comparison to allow more significance in the comparison to certain metrics. Another alternate norm may be used for comparison in which the summation is done over pitch locations, such as:

$$D = w_1 \sum_{i=1}^{9} (e_{1i})^2 + w_2 \sum_{i=1}^{9} (e_{2i})^2 + \ldots$$

where i varies according to pitch location, or the weightings may be varied according to region or pitch location, such as:

$$D = w_1 \sum_{j=1}^{n} (e_j)^2 + w_2 \sum_{j=1}^{n} (e_j)^2 + \ldots + w_9 \sum_{j=1}^{n} (e_j)^2$$

where the weights $w_1$, $w_2$, etc. are for the various pitch locations (or alternately for regions) and some number of one to n metrics (for example barrel speed, heading angle, hip angle movement, etc.) may be may be computed for each pitch location (or region). Likewise, other variations of multiple metrics, locations, regions, and weightings may be used in computing a similarity between players.

The computation of similarity may be done on a case-by-case basis, or a coach may request that a comparison of a single player or multiple players be done across a database of players, in effect searching the database for close comparisons. An algorithm and associated software would perform the search through calculations of swing fingerprint data sets or calculations of norms and comparison of pre-computed data. The threshold (or multiple thresholds if more than one norm is used) of "close" may be set by the coach or other user, or may be predetermined in a search algorithm.

Figure 15:
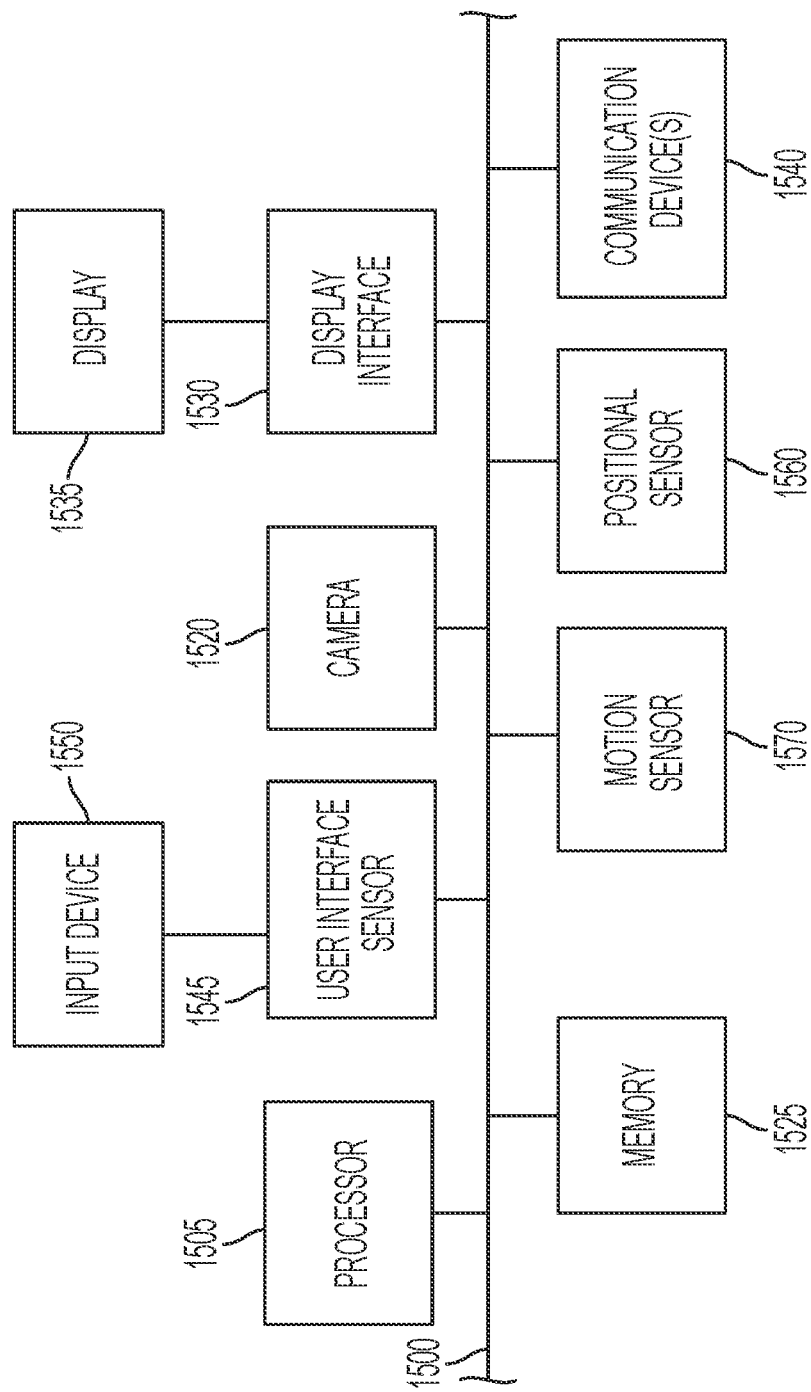
FIG. 15 depicts example hardware that may be included in any of the electronic components of the system.

FIG. 15 depicts example internal hardware that may be included in any of the electronic components of the system, such as the server, computing device and/or bat-mounted device in the system. An electrical bus 1500 serves as an information highway interconnecting the other illustrated components of the hardware. Processor 1505 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 1525. A memory device may include a single device or a collection of devices across which data and/or instructions are stored. For example, the sensor 114, the server 115 and/or the computing device 119 of FIG. 1 may include memory devices that hold programming instructions and/or a data store. A computer program product may include a memory device containing programming instructions to implement any or all of the methods described in this document.

An optional display interface 1530 may permit information from the bus 1500 to be displayed on a display device 1535 in visual, graphic or alphanumeric format. For example, the system may display visual swing fingerprint representations such as those shown in FIGS. 8A-10 on the display device 1535. An audio interface and audio output (such as a speaker) also may be provided. Communication with external devices (such as in-bat sensors, cameras or other devices) may occur using one or more wired or wireless communication devices 1540 such as a radio and antenna, a radio frequency identification (RFID) tag and/or short-range or near-field communication transceiver, each of which may optionally communicatively connect with other components of the device via one or more communication system. Each communication device 1540 may be configured to be communicatively connected to a communications network, such as the Internet, a local area network or a cellular telephone data network.

The hardware may also include a user interface sensor 1545 that allows for receipt of data from input devices 1550 such as a keyboard, a mouse, a joystick, a touchscreen, a touch pad, a remote control, a pointing device and/or microphone. Digital image frames also may be received from a camera 1520 that can capture video and/or still images. The system also may include a positional sensor 1580 and/or motion sensor 1570 to detect position and movement of the device. Examples of motion sensors 1570 include gyroscopes or accelerometers. Examples of positional sensors 1580 include a global positioning system (GPS) sensor device that receives positional data from an external GPS network.

Certain terms that are used above are defined below.

The terms "electronic device" and "computing device" refers to a device or system that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. Examples of electronic devices include personal computers, servers, mainframes, virtual machines, containers, gaming systems, televisions, digital home assistants and mobile electronic devices such as smartphones, fitness tracking devices, wearable virtual reality devices, Internet-connected wearables such as smart watches and smart eyewear, personal digital assistants, cameras, tablet computers, laptop computers, media players and the like. Electronic devices also may include appliances and other devices that can communicate in an Internet-of-things arrangement, such as smart thermostats, refrigerators, connected light bulbs and other devices. Electronic devices also may include components of vehicles such as dashboard entertainment and navigation systems, as well as on-board vehicle diagnostic and operation systems. In a client-server arrangement, the client device and the server are electronic devices, in which the server contains instructions and/or data that the client device accesses via one or more communications links in one or more communications networks. In a virtual machine arrangement, a server may be an electronic device, and each virtual machine or container also may be considered an electronic device. In the discussion below, a client device, server device, virtual machine or container may be referred to simply as a "device" for brevity. Additional elements that may be included in electronic devices were discussed above in the context of FIG. 15.

The terms "processor" and "processing device" refer to a hardware component of an electronic device that is configured to execute programming instructions. Except where specifically stated otherwise, the singular terms "processor" and "processing device" are intended to include both single-processing device embodiments and embodiments in which multiple processing devices together or collectively perform a process.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

In this document, the term "camera" refers generally to a hardware sensor that is configured to acquire digital images. A camera may capture still and/or video images, and optionally may be used for other imagery-related applications. For example, a camera can be held by a user such as a DSLR (digital single lens reflex) camera, cell phone camera, or video camera. The camera may be part of another electronic device, such as a mobile phone or tablet in some embodiments. In addition, an imaging device can be mounted on an accessory such as a monopod or tripod. The imaging device can also be mounted on a transporting vehicle such as an aerial drone or a robotic vehicle having a transceiver that can send captured digital images to, and receive commands from, other components of the system.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A method of analyzing swing of an object by a person, the method comprising:
   by one or more sensors, capturing motion data for an object as a person swings the object toward a target;
   by a processor, deriving a plurality of paths of motion of the object over a plurality of swings from the motion data;
   by the processor, for each of a plurality of the captured paths of motion, determining a slot representing a portion of the path of motion along which the object traveled immediately prior to reaching a point of impact with the target; and
   by the processor, saving a plurality of the slots to a swing fingerprint representation data set in a data store.

2. The method of claim 1, wherein the one or more sensors comprise an inertial measurement unit (IMU) that is attached to the object; and
   capturing the data comprises capturing measurements of:
      linear accelerations of the object prior to the point of impact, and
      rotational velocities of the object prior to the point of impact; and
   deriving the paths of motion and the slots comprises dong so in three-dimensional space.

3. The method of claim 2, wherein deriving the paths of motion comprises applying the rotational velocities and data relating to position and orientation of the sensor to a dynamic reconstruction algorithm.

4. The method of claim 2, further comprising:
   analyzing the sensor data to detect vibrations of the object; and
   using characteristics of the detected vibrations to infer an impact point on the object at which the object hit the target.

5. The method of claim 1, wherein determining each of the slots comprises, for each slot:
   determining a heading angle for the object in the slot; and
   determining an elevation angle for the object in the slot.

6. The method of claim 1, further comprising outputting a visual representation of the swing fingerprint data set from a plurality of viewing angles on a display device, wherein the visual representation of the swing fingerprint data set comprises one or more of the following:
   a top-down view that illustrates each of the slots in the swing fingerprint data set with a heading angle of the object in each slot; or
   a side view that illustrates each of the slots in the swing fingerprint data set with an elevation angle of the object in each slot.

7. The method of claim 6, wherein outputting the visual representation of the swing fingerprint data set further comprises:
   displaying a plurality of regions in the visual representation; and
   when illustrating each slot, presenting the slot in a region having a color that represents a measured parameter or a function of the measured parameter of the object for that slot.

8. The method of claim 7, wherein the measured parameter or function of the measured parameter of the object comprises one or more of the following:
   speed of the object at the point of impact;
   acceleration of the object toward the point of impact;
   trigger to impact time for the object; or
   length of the slot in a specified direction.

9. The method of claim 6, wherein outputting the visual representation of the swing fingerprint data set further comprises;
   displaying a plurality of regions in the visual representation
   when illustrating the visual representation, presenting each of the regions in a color that represents a function of a measured parameter of the object over multiple swings for which slots are associated with that region.

10. The method of claim 9, wherein the measured parameter or function of the measured parameter of the object comprises one or more of the following:
    speed of the object at the point of impact;
    acceleration of the object toward the point of impact;
    trigger to impact time for the object; or
    length of the slot in a specified direction.

11. The method of claim 9, further comprising:
    receiving, via a user interface, a selection of a layer in the three-dimensional visual representation, wherein the layer comprises a contiguous group of the subregions; and
    displaying, on the display device, a two-dimensional representation of the contiguous group of subregions in the selected layer.

12. The method of claim 6, wherein:
    deriving the plurality of paths of motion of the object comprises plotting the paths in relation to a three-dimensional coordinate system located in a frame in which the person swings the object; and
    outputting a visual representation of the swing fingerprint data set comprises projecting the paths of motion to a two-dimensional plane.

13. The method of claim 6, further comprising:
    analyzing the sensor data to detect vibrations of the object;

using characteristics of the detected vibrations to infer, for at least some of the slots, an impact point on the object at which the object hit the target; and for at least one of the viewing angles, displaying the visual representation comprises also displaying the inferred impact points.

14. The method of claim 6, further comprising outputting a visual representation of the player along with the visual representation of the swing fingerprint data set.

15. The method of claim 1, further comprising:
outputting a three-dimensional visual representation of the swing fingerprint data set on a display device, wherein the three-dimensional visual representation comprises a zone with a plurality of subregions; and
before including any of the subregions in the visual representation, assigning a color to the subregion, wherein the assigned color for each subregion is derived from a speed of the object over one or more swings for that subregion.

16. The method of claim 1, further comprising:
receiving, via a user interface, a selection of a view to be displayed, wherein the selected view is one of a plurality of candidate views that include:
a top-down view that illustrates each of the slots in the swing fingerprint with a heading angle of the object for each slot,
a side view that illustrates each of the slots in the swing fingerprint with an elevation angle of the object for each slot, and
a three-dimensional visual representation that illustrates a plurality of color-coded subregions, in which each the color of each subregion is derived from a speed of the object for one or more slots in that subregion; and
outputting the selected view on a display device.

17. The method of claim of claim 1, wherein the object is a bat and the target is a ball.

18. The system of claim 17, wherein:
the motion sensor comprises an inertial measurement unit (IMU) that is attached to the object; and
the motion data comprises measurements of:
linear accelerations of the object prior to the point of impact, and
rotational velocities of the object prior to the point of impact.

19. The system of claim 17, wherein the instructions to determine each of the slots comprise instructions to, for each slot:
determine a heading angle for the object in the slot; and
determine an elevation angle for the object in the slot.

20. The system of claim 17, further comprising instructions to output, on a display device, a visual representation of the swing fingerprint data set from a plurality of viewing angles, wherein the visual representation of the swing fingerprint data set comprises one or more of the following:
a top-down view that illustrates each of the slots in the swing fingerprint data set with a heading angle of the object in each slot; or
a side view that illustrates each of the slots in the swing fingerprint data set with an elevation angle of the object in each slot.

21. The system of claim 17, wherein the instructions to output the visual representation further comprise instructions to:
display a plurality of regions in the visual representation; and when illustrating each slot, present that slot in a region having a color that represents a measured parameter or a function of the measured parameter of the object for that slot.

22. The system of claim 21, wherein the instructions to output the visual representation of the swing fingerprint data set further comprise instructions to;
display a plurality of regions in the visual representation when illustrating the visual representation, present each of the regions in a color that represents a function of a measured parameter of the object over multiple swings for which slots are associated with that region.

23. The system of claim 21, further comprising instructions to, in response to receiving via a user interface a selection of a layer in the three-dimensional visual representation, wherein the layer comprises a contiguous group of the subregions:
display, on the display device, a two-dimensional representation of the contiguous group of subregions in the selected layer.

24. The system of claim 17, further comprising instructions to:
cause a display device to output a three-dimensional visual representation of the swing fingerprint data set, wherein the three-dimensional visual representation comprises a zone with a plurality of subregions;
before including any of the subregions in the visual representation, assign a color to the subregion, wherein the assigned color for each subregion is derived from a speed of the object over one or more swings for that subregion; and
when displaying each subregion, displaying it in its assigned color.

25. The system of claim 17, further comprising instructions to output a selected view on a display device, wherein the selected view is received via a user interface and selected from a plurality of candidate views that include:
a top-down view that illustrates each of the slots in the swing fingerprint data set with a heading angle of the object for each slot,
a side view that illustrates each of the slots in the swing fingerprint data set with an elevation angle of the object for each slot, and
a three-dimensional visual representation that illustrates a plurality of color-coded subregions, in which each the color of each subregion is derived from a speed of the object for one or more slots in that subregion.

26. The system of claim 17, wherein the object is a bat and the target is a ball.

27. A system for analyzing swing of an object by a person, the method comprising:
a motion sensor configured to attach to an object and capture motion data as a person swings the object toward a target; and
a computer-readable medium containing programming instructions that are configured to cause a processor to:
receive the motion data or information derived from the motion data,
derive a plurality of paths of motion of the object over a plurality of swings from the motion data or information,
for each of a plurality of the captured paths of motion, determine a slot representing a portion of the path of motion along which the object traveled immediately prior to reaching a point of impact with the target, and save a plurality of the slots to a swing fingerprint data set in a data store.

28. A method of presenting characteristics of a person who is swinging an object toward a target, the method comprising:
- by one or more sensors, using a motion sensor that is attached to an object to capture motion data as the person swings the object toward a target;
- by a processor, deriving a plurality of paths of motion for a body part of the person over a plurality of swings from the motion data;
- by the processor, for each of a plurality of the captured paths of motion, determining a motion metric representing a portion of the path of motion along which the body part traveled immediately prior to the object reaching a point of impact with the target; and
- by the processor, saving a plurality of the motion metrics to a swing fingerprint representation data set in a data store.

29. The method of claim 28, further comprising outputting a visual representation of the swing fingerprint data set in one or more of the following views:
- a top-down view; or
- a side view,
- wherein outputting the visual representation of the swing fingerprint data set further comprises:
  - displaying a plurality of regions in the visual representation, and
  - when illustrating each motion metric, presenting the motion metric in a region having a color that represents a magnitude of that motion metric.

* * * * *